(12) United States Patent
Wakabayashi

(10) Patent No.: US 7,692,716 B2
(45) Date of Patent: Apr. 6, 2010

(54) ELECTRONIC CAMERA WITH A SHIELDING MEMBER

(75) Inventor: Tsutomu Wakabayashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 703 days.

(21) Appl. No.: 10/991,855

(22) Filed: Nov. 19, 2004

(65) Prior Publication Data

US 2005/0110896 A1    May 26, 2005

(30) Foreign Application Priority Data

Nov. 25, 2003   (JP)   ............... 2003-394052

(51) Int. Cl.
*G03B 7/00* (2006.01)
*G03B 9/08* (2006.01)
*H04N 5/235* (2006.01)
*H04N 5/238* (2006.01)

(52) U.S. Cl. .................. 348/362; 348/367; 396/452

(58) Field of Classification Search ............ 348/362, 348/367; 396/452
See application file for complete search history.

(56) References Cited

U.S. PATENT DOCUMENTS

| | | | | |
|---|---|---|---|---|
| 3,810,225 | A * | 5/1974 | Nakamura | 396/453 |
| 4,479,704 | A * | 10/1984 | Masunaga | 396/187 |
| 2003/0012573 | A1 * | 1/2003 | Sekizawa et al. | 396/463 |
| 2004/0223076 | A1 | 11/2004 | Nakano et al. | |
| 2004/0223756 | A1 | 11/2004 | Nakano et al. | |
| 2004/0223757 | A1 | 11/2004 | Nakano et al. | |
| 2004/0223758 | A1 | 11/2004 | Nakano et al. | |
| 2005/0225664 | A1 * | 10/2005 | Matsumoto | 348/362 |

FOREIGN PATENT DOCUMENTS

| | | |
|---|---|---|
| JP | A-60-29096 | 2/1985 |
| JP | A 11-122542 | 4/1999 |
| JP | A-2000-131731 | 5/2000 |
| JP | 2001-083574 A | 3/2001 |
| JP | A-2002-290823 | 10/2002 |
| JP | A-2004-260797 | 9/2004 |
| JP | A 2004-317589 | 11/2004 |
| JP | A 2004-317590 | 11/2004 |
| JP | A 2004-317665 | 11/2004 |
| JP | A 2004-325673 | 11/2004 |

* cited by examiner

*Primary Examiner*—Lin Ye
*Assistant Examiner*—Chia-Wei A Chen
(74) *Attorney, Agent, or Firm*—Oliff & Berridge, PLC

(57) ABSTRACT

An electronic camera includes: an electrical charge storage-type image-capturing element that stores an electrical charge by receiving subject light; a shielding member that allows the subject light to pass to the image-capturing element or blocks the subject light to the image-capturing element; an electromagnetic actuator used to drive the shielding member at least in a closing direction; a storage control device that starts an electrical charge storage at the image-capturing element after a time point at which the shielding member is detected to be in an open state allowing the subject light to pass and ends the electrical charge storage once a preset length of exposure time elapses; and a shield control device that outputs an instruction for driving the shielding member in the closing direction to the electromagnetic actuator before the electrical charge storage ends.

5 Claims, 16 Drawing Sheets

FIG.15 ANOTHER EMBODIMENT ADOPTED WHEN $T_{exp} \geq T_{h1} + T_{d2} - T_{m1} - T_{m2}$

US 7,692,716 B2

ELECTRONIC CAMERA WITH A SHIELDING MEMBER

INCORPORATION BY REFERENCE

The disclosure of the following priority application is herein incorporated by reference:

Japanese Patent Application No. 2003-394052 filed Nov. 25, 2003.

BACKGROUND OF THE INVENTION

1. Field of the Invention

The present invention relates to an electronic camera that captures a subject image with a solid image-capturing element, and in particular, it relates to an electronic camera which blocks light with a shielding member so that light does not enter the image-capturing element except for during an image-capturing operation.

2. Description of the Related Art

There is a technology known in the related art whereby a focal plane shutter used to open/close a photographic aperture is driven with an electromagnetic actuator (see Japanese Laid Open Patent Publication No. 2001-83574). Under normal circumstances, there is a time lag before the movable portion of an electromagnetic actuator starts to move in response to a drive signal input to a coil.

SUMMARY OF THE INVENTION

When a closing drive signal is transmitted to the electromagnetic actuator after a photographic exposure operation is completed in a camera employing the shutter device disclosed in Japanese Laid Open Patent Publication 2001-83574, the sequence of photograph processing (image capturing sequence) completed by closing the photographic aperture following the exposure becomes a lengthy process due to the aforementioned time lag. This time loss, which delays the start of the photographing operation for the subsequent frame, tends to become more problematic when the user wishes to perform photographing operations repeatedly over a plurality of frames.

According to the 1st aspect of the invention, an electronic camera comprises: an electrical charge storage-type image-capturing element that stores an electrical charge by receiving subject light; a shielding member that allows the subject light to pass to the image-capturing element or blocks the subject light to the image-capturing element; an electromagnetic actuator used to drive the shielding member at least in a closing direction; a storage control device that starts an electrical charge storage at the image-capturing element after a time point at which the shielding member is detected to be in an open state allowing the subject light to pass and ends the electrical charge storage once a preset length of exposure time elapses; and a shield control device that outputs an instruction for driving the shielding member in the closing direction to the electromagnetic actuator before the electrical charge storage ends.

According to the 2nd aspect of the invention, in the electronic camera according to the 1st aspect, it is preferred that the storage control device adjusts timing with which the electrical charge storage starts so as to ensure that the electrical charge storage ends at a time point preceding by a specific length of time a time point at which drive of the shielding member is started in response to the instruction for driving the shielding member in the closing direction.

According to the 3rd aspect of the invention, in the electronic camera according to the 2nd aspect, it is preferred that if a length of exposure time is so great that the electrical charge storage does not end at the time point preceding by the specific length of time the time point of the drive start even with the timing with which the electrical charge storage starts advanced by the storage control device, the shield control device delays issuing the instruction for driving the shielding member in the closing direction in correspondence to the length of exposure time to the electromagnetic actuator.

According to the 4th aspect of the invention, in the electronic camera according to the 1st aspect, it is preferred that the image-capturing element discharges an unnecessary electrical charge between a specific time point after an instruction for a photographing start is issued and a time point at which a closed state whereby the subject light is blocked is no longer detected.

According to the 5th aspect of the invention, in the electronic camera according to the 1st aspect, it is preferred that the image-capturing element starts outputting the stored electrical charge once a closed state whereby the subject light is blocked is detected following an end of the electrical charge storage.

According to the 6th aspect of the invention, an electronic camera comprises: an electrical charge storage-type image-capturing element that stores an electrical charge by receiving subject light; a shielding member that allows the subject light to pass to the image-capturing element or blocks the subject light to the image-capturing element by opening or closing an aperture; an electromagnetic actuator used to drive the shielding member at least in a closing direction; and a control device that calculates a length of exposure time, controls the image-capturing element so as to store the electrical charge while the calculated exposure time elapses and controls drive of the electromagnetic actuator, and the control device outputs a drive signal to the electromagnetic actuator before the exposure time ends so as to start movement of the shielding member in the closing direction after the exposure time ends.

According to the 7th aspect of the invention, in the electronic camera according to the 6th aspect, it is preferred that: a specific time lag that elapses between reception of the drive signal from the control device and an operation start, manifests in the electromagnetic actuator; and if the exposure time is shorter than a length of the specific time lag, the control device starts implementing control on the image-capturing element in conformance to the exposure time after outputting the drive signal to the electromagnetic actuator.

According to the 8th aspect of the invention, in the electronic camera according to the 6th aspect, it is preferred that: a specific time lag that elapses between reception of the drive signal from the control device and an operation start, manifests in the electromagnetic actuator; and if the exposure time is longer than a length of the specific time lag, the control device outputs the drive signal to the electromagnetic actuator after starting to implement control on the image-capturing element in conformance to the exposure time.

According to the 9th aspect of the invention, in the electronic camera according to the 6th aspect, it is preferred that the control device starts reading out the electrical charge stored at the image-capturing element after the shielding member is driven in response to the drive signal and the subject light becomes blocked.

According to the 10th aspect of the invention, in the electronic camera according to the 6th aspect, it is preferred that before controlling the electromagnetic actuator to drive the shielding member in the closing direction, the control device controls the electromagnetic actuator to drive the shielding member in an opening direction and continuously drives the electromagnetic actuator until a specific length of time elapses after the aperture is opened.

DESCRIPTION OF THE PREFERRED EMBODIMENTS

The following is an explanation of the best mode for carrying out the invention, given in reference to the drawings.

Figure 1:
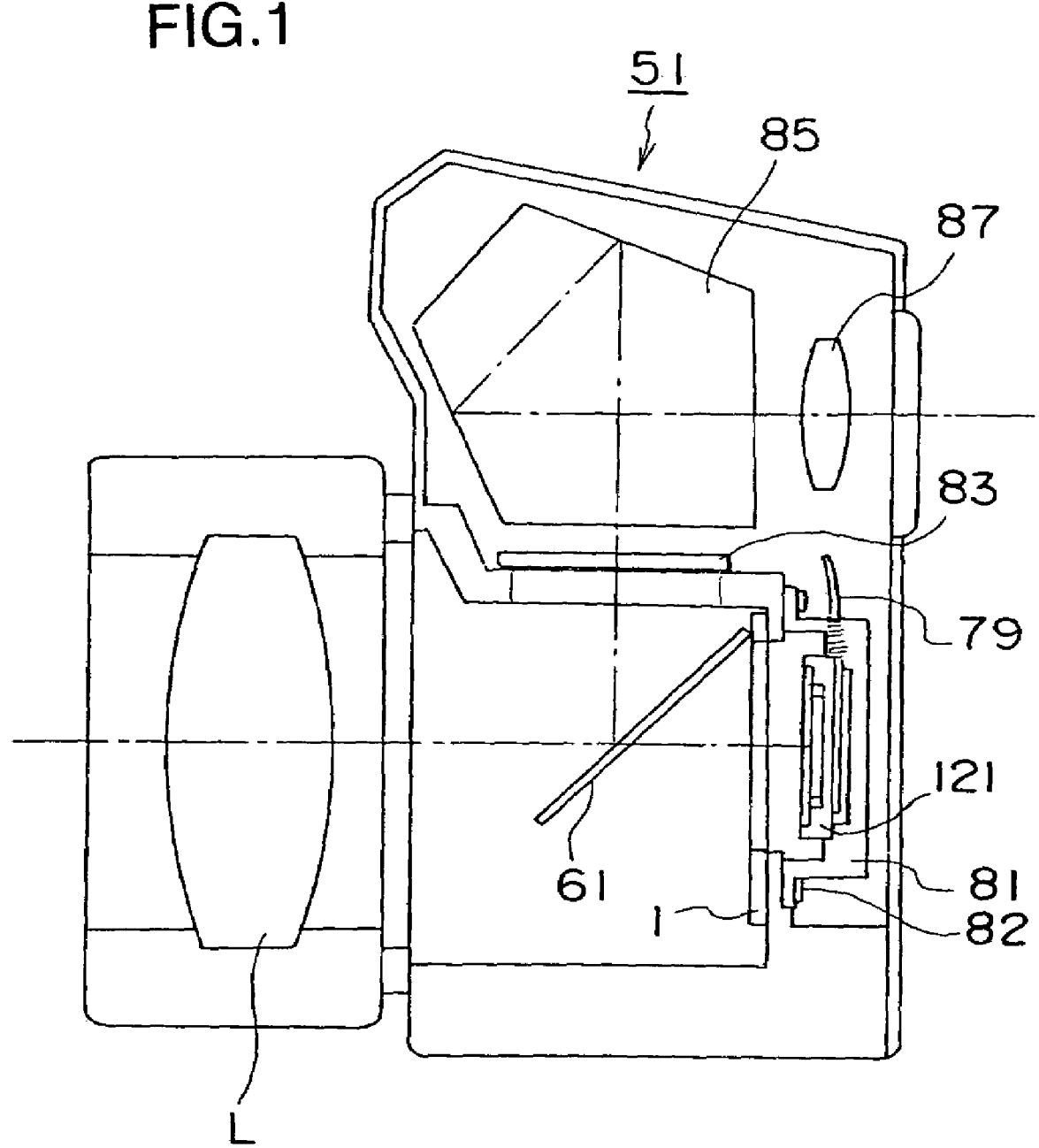
FIG. 1 is a side elevation of a single lens reflex electronic camera achieved in an embodiment of the present invention.

FIG. 1 is a side view of the single lens reflex electronic camera achieved in the embodiment of the present invention. FIG. 1 shows that a photographic lens L is mounted at an electronic camera 51. Light from the subject having passed through the photographic lens L is reflected at a mirror 61 and forms an image on a viewfinder screen 83 which is then observed by the photographer through a pentaprism 85 and an eyepiece lens 87, as known in the related art. For a photographing operation, the mirror 61 is made to swing upward so that the subject light forms an image on the image-capturing surface of an image-capturing element 121. The image-capturing element 121 may be constituted with, for instance, a CCD image sensor.

The image-capturing element 121 is locked onto a holder 81, and its photoelectric conversion output is output to an A/D conversion circuit to be detailed later via a flexible printed board 79. The holder 81 is attached to the electronic camera 51 with screws 82. A focal plane shutter 1 is disposed to the front of the image-capturing element 121 (toward the photographic lens L).

The shutter of the electronic camera 51 in the embodiment is a so-called electronic shutter, and the length of time over which electrical charges are stored at the image-capturing element 121 while the subject light is allowed to enter the image-capturing surface of the image-capturing element 121 is equivalent to the shutter speed. The focal plane shutter 1 is included in the camera in order to shield the image-capturing element 121 from the subject light after the electrical charge storage instead of in order to regulate the length of the electrical charge storage time.

Accordingly, only one set of shutter blades is required to shield the image-capturing element from light, and it is not necessary to provide two sets of shutter blades, i.e., a front curtain set and a rear curtain set, and to ensure that their operations are controlled accurately. Since the shutter unit only needs to include a single blade set, its thickness can be reduced compared to that of a focal plane shutter with two sets of blades, and thus, the installation space can be saved.

Figure 2:
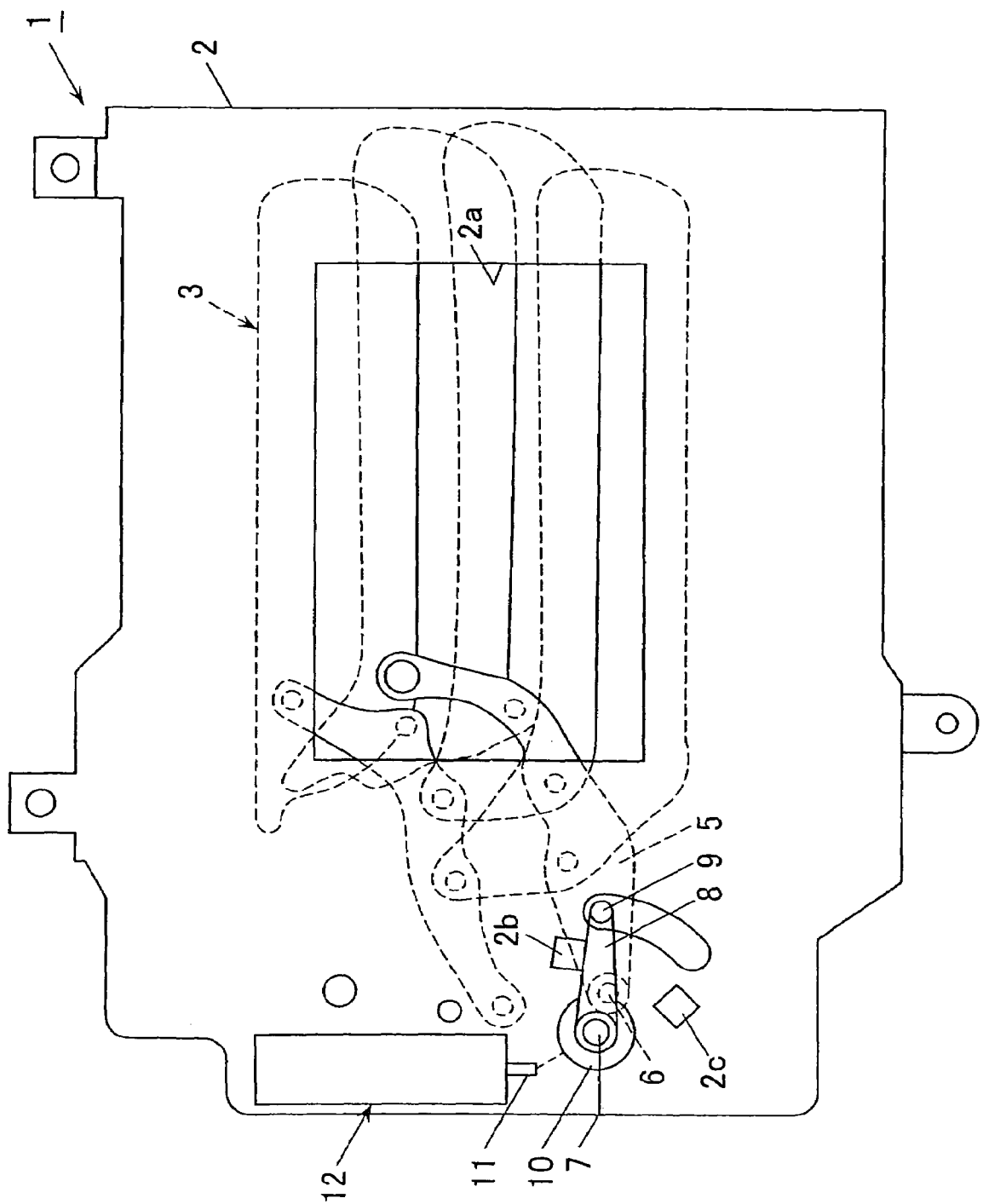
FIG. 2 is a front view of the shutter in a state in which the aperture is closed with the blade set.
Figure 3:
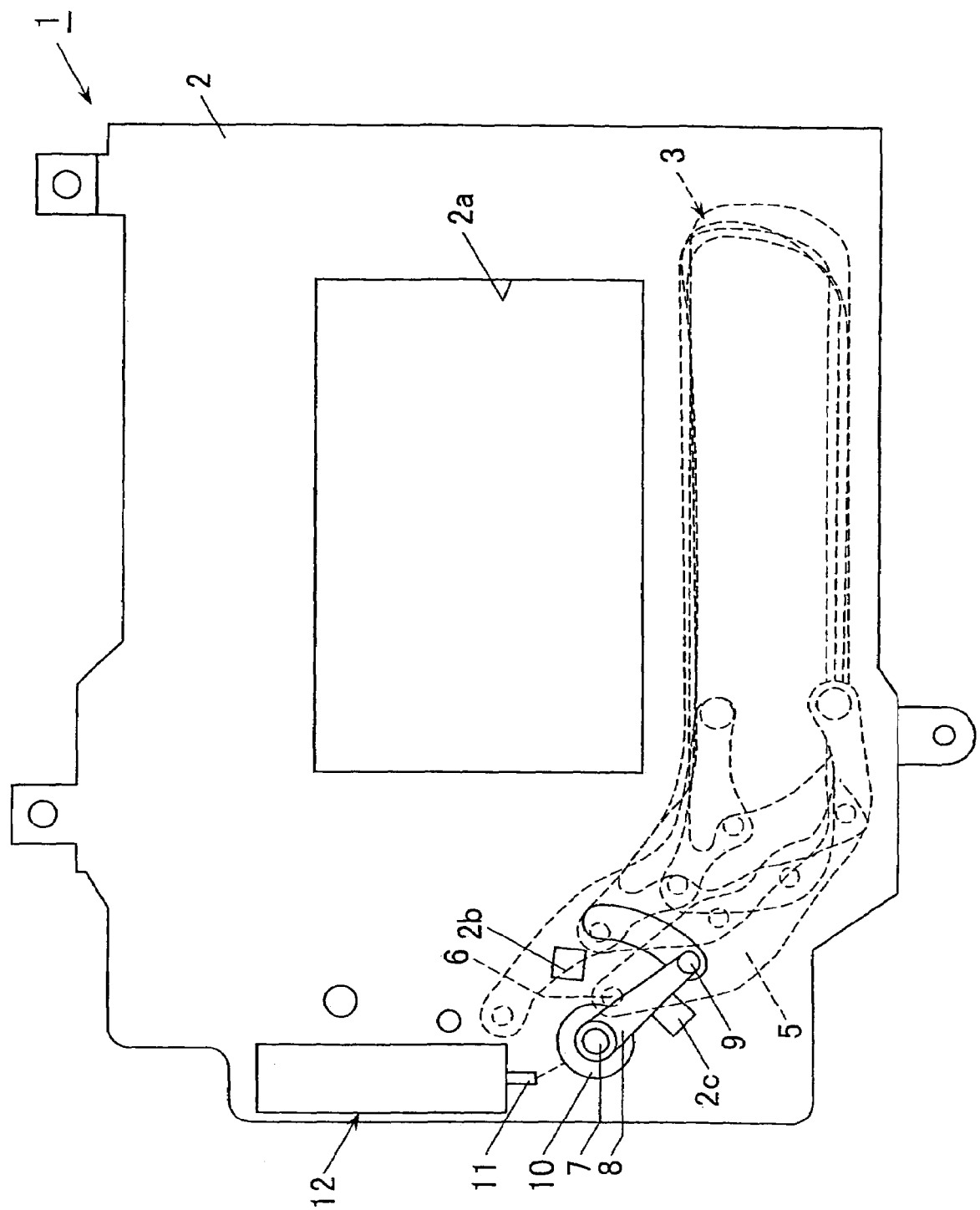
FIG. 3 is a front view of the shutter in a state in which the blade set is withdrawn and the aperture is open.

FIGS. 2 and 3 illustrate the structure of and different operating states assumed in the focal plane shutter 1. FIG. 2 is a front view of the focal plane shutter 1 in a state in which an aperture 2a, i.e., the photographing aperture, is closed off by a single blade set 3. FIG. 3 shows a state in which the blade set 3 in FIG. 2 has been withdrawn to open the aperture 2a. The focal plane shutter 1 in FIGS. 2 and 3 includes a shutter baseplate 2 which is built into the electronic camera 51. The aperture 2a assuming a rectangular shape is provided at the shutter baseplate 2, and the blade set 3 used to open/close the aperture 2a is mounted at the shutter baseplate 2 via a blade arm 5. The blade arm 5 is allowed to rotate around a spindle 6.

In addition, a blade drive lever (drive member) 8, which is allowed to rotate around a support shaft 7, is disposed at the shutter baseplate 2. The front end of the drive lever 8 is linked to the blade arm 5 via an operating pin 9. In addition, a gear 10 having the same center of rotation as that of the spindle 7 is fixed to the drive lever 8 as an integrated part thereof. A pinion gear (not shown) coupled with a pinion shaft 11 of a motor 12, which constitutes an electromagnetic actuator, interlocks with the gear 10 so as to communicate a rotational drive force from the motor 12.

As the motor 12 rotates in the closing direction so as to move the blade set 3 in the closing direction, the drive lever 8 rotates in the counterclockwise direction in FIG. 2 (FIG. 3) to come into contact with a close position regulating projection 2b at the shutter baseplate 2, and thus, the turning movement of the drive lever is regulated. If, on the other hand, the motor 12 rotates in the opening direction so as to move the blade set 3 in the opening direction, the drive lever 8 rotates in the clockwise direction in FIG. 2 (FIG. 3) to come into contact with a open position regulating projection 2c at the shutter baseplate 2, and the turning movement of the drive lever is thus regulated.

The motor 12 is structured so as to hold the drive lever 8 with stability at the positions indicated in FIGS. 2 and 3. Namely, by stopping the rotation of the motor 12 so that the drive lever 8 rests at the close position in FIG. 2, the blade set 3 can be held in place with a high degree of stability in the closed state. In addition, by stopping the rotation of the motor 12 so that the drive lever 8 rests at the open position, the blade set 3 can be held in place with a high degree of stability in the open state.

The power supply to the motor 12, with which the drive lever 8 rotates counterclockwise, is referred to as a reverse power supply, whereas the power supply to the motor 12 with which the drive lever 8 rotates clockwise is referred to as a forward power supply. In response to a reverse power supply to the motor 12, the blade arm 5 rotates counterclockwise around the pinion 6 together with the drive lever 8, and thus, the aperture 2a becomes closed by the blade set 3.

In response to a forward power supply to the motor 12, the blade arm 5 rotates clockwise around the pinion 6 together with the drive lever 8, thereby causing the blade set 3 to open the aperture 2a. Since the opening/closing drive of the blade set 3 is achieved with the motor 12 in the focal plane shutter 1, the shutter 1 does not require any mechanical charge mechanism.

Figure 4:
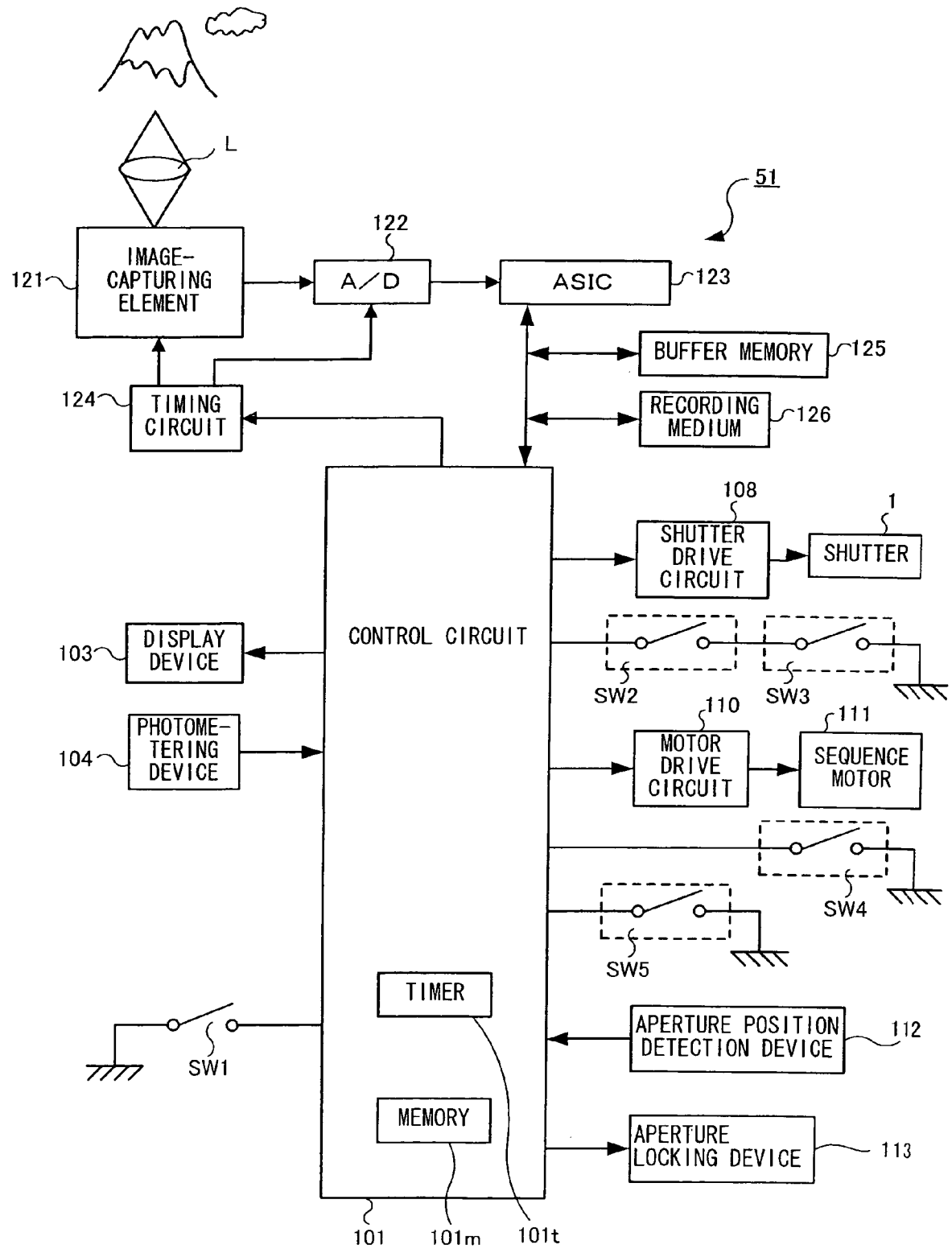
FIG. 4 is a block diagram showing the structure of the electronic camera.

FIG. 4 is a block diagram of the structure adopted in the electronic camera 51. An arithmetic operation circuit (control circuit) 101 in FIG. 4 is constituted with a microcomputer and the like. The arithmetic operation circuit 101 includes CPU peripheral circuits such as a memory 101m and a timer circuit 101t. The arithmetic operation circuit 101 executes specific arithmetic operations by using signals input thereto from various blocks to be detailed later and outputs control signals to the individual blocks based upon the results of the arithmetic operations. The memory 101m constituted with a nonvolatile memory stores in memory various flags to be explained later.

A display device 103 brings up a display indicating the shutter speed (shutter time) and the aperture value in response to an instruction issued by the arithmetic operation circuit 101. A photometering device 104 detects the quantity of light having passed through the photographic lens L. It is to be noted that the full open aperture value of the photographic lens L is F2.8 and that control is enabled over a range of F2.8 to F22.

A shutter release switch SW1, which enters an on state by interlocking with depression of a shutter release button (not shown), shifts into an off state as the shutter release button having been held down is released. An operation signal generated at the shutter release switch SW1 is used to trigger a photographing start instruction.

A shutter drive circuit 108 opens/closes the blade set 3 through a forward power supply or a reverse power supply to the motor 12 which drives the focal plane shutter 1. Shutter switches SW2 and SW3 are used to detect the blade set 3 in a closed state and in an open state respectively. The shutter switch SW2 shifts from an on state to an off state when the blade set 3 has closed the aperture 2a completely (when the aperture set 3 has moved in the closing direction slightly after completely closing the aperture, to be more exact). The shutter switch SW3, on the other hand, shifts from an on state to an off state when the blade set 3 has completely withdrawn from the aperture 2a (when the blade set 3 has moved slightly further in the opening direction after completely opening the aperture, to be more exact). The shutter switches SW2 and SW3 are each turned on or off depending upon the position to which the drive lever 8 is rotated (see FIGS. 2 and 3). It is to be noted that the lengths of time required to open and close the focal plane shutter 1 (e.g., the lengths of time over which the blade set 3 runs) are each approximately 11 msec.

The shutter switches SW2 and SW3 are connected in series, the individual signals generated at the shutter switches SW2 and SW3 are synthesized, and the synthesized signal is input to a single input port at the arithmetic operation circuit 101. Thus, when the shutter switches SW2 and SW3 are both in an on state (the serial connection output: on), an input signal at L level is input to the arithmetic operation circuit 101, whereas when at least either the shutter switch SW2 or the shutter switch SW3 is in an off state (serial connection output: off), an input signal at H level is input to the arithmetic operation circuit 101. It is to be noted that the input port at the arithmetic operation circuit 101 is internally pulled up so as to assume that an H level signal is input when there is actually no input (serial connection output: off).

A motor drive circuit 110 controls the rotation of a sequence motor 111 in response to a command issued by the arithmetic operation circuit 101. The sequence motor 111 constitutes an image-capturing sequence drive mechanism. The image-capturing sequence drive mechanism controls the photographing sequence in which the mirror 61 is raised/lowered, the aperture (not shown) is driven and the like through drive control of the sequence motor 111.

Sequence switches SW4 and SW5, which are part of the image-capturing sequence drive mechanism, are used to generate sequence control timing. The sequence switch SW4 is structured so that it remains in an on state while the mirror is at a lowered position, enters an off state immediately after a mirror up operation starts and shifts back into an on state at the end of the mirror up operation. The sequence switch SW5, which is structured so that it shifts from an off state to an on state while a mirror down operation is in progress and shifts from an on state to an off state approximately 11 msec before the end of the mirror up operation, generates the timing with which the operation of the motor 12 starts. The length of time 11 msec corresponds to the length of time required to open or close the focal plane shutter 11 mentioned earlier.

An aperture position detection device 112 detects the aperture position to which the aperture is set by the sequence drive mechanism and outputs a detection signal to the arithmetic operation circuit 101. An aperture locking device 113 stops the aperture being driven and locks the aperture at a specific aperture value. The sequence drive mechanism is structured so that the aperture locked by the aperture locking device 113 becomes released while the mirror down operation is in progress.

The image-capturing element 121 captures a subject image having passed through the photographic lens L and outputs image signals constituted of stored electrical charges. The image-capturing sensitivity (exposure sensitivity) of the image-capturing element 121 is set to a level equivalent to ISO 100. In addition, the image-capturing element 121 has the electronic shutter function as explained earlier and a setting can be selected in specific steps within a 1 sec through $\frac{1}{16,000}$ sec range. The A/D conversion circuit 122 converts analog image signals output from the image-capturing element 121 to digital signals. An image processing circuit 123 constituted of an ASIC or the like executes image processing such as white balance (WB) adjustment on the digital signals, compression processing for compressing the image data resulting from the image processing into a specific format, decompression processing for decompressing the compressed data and the like.

A timing circuit 124 generates timing signals needed to engage the image-capturing element 121 and the A/D conversion circuit 122 in operation and outputs the respective timing signals to the image-capturing element 121 and the A/D conversion circuit 122. In a buffer memory 125, image data to undergo various types of processing including the image processing, the compression processing and the decompression processing are temporarily stored. A recording medium 126 is a recording medium such as a memory card, which can be detachably loaded into the electronic camera 51. Image data having undergone the compression processing are recorded in the recording medium 126.

Figure 5:
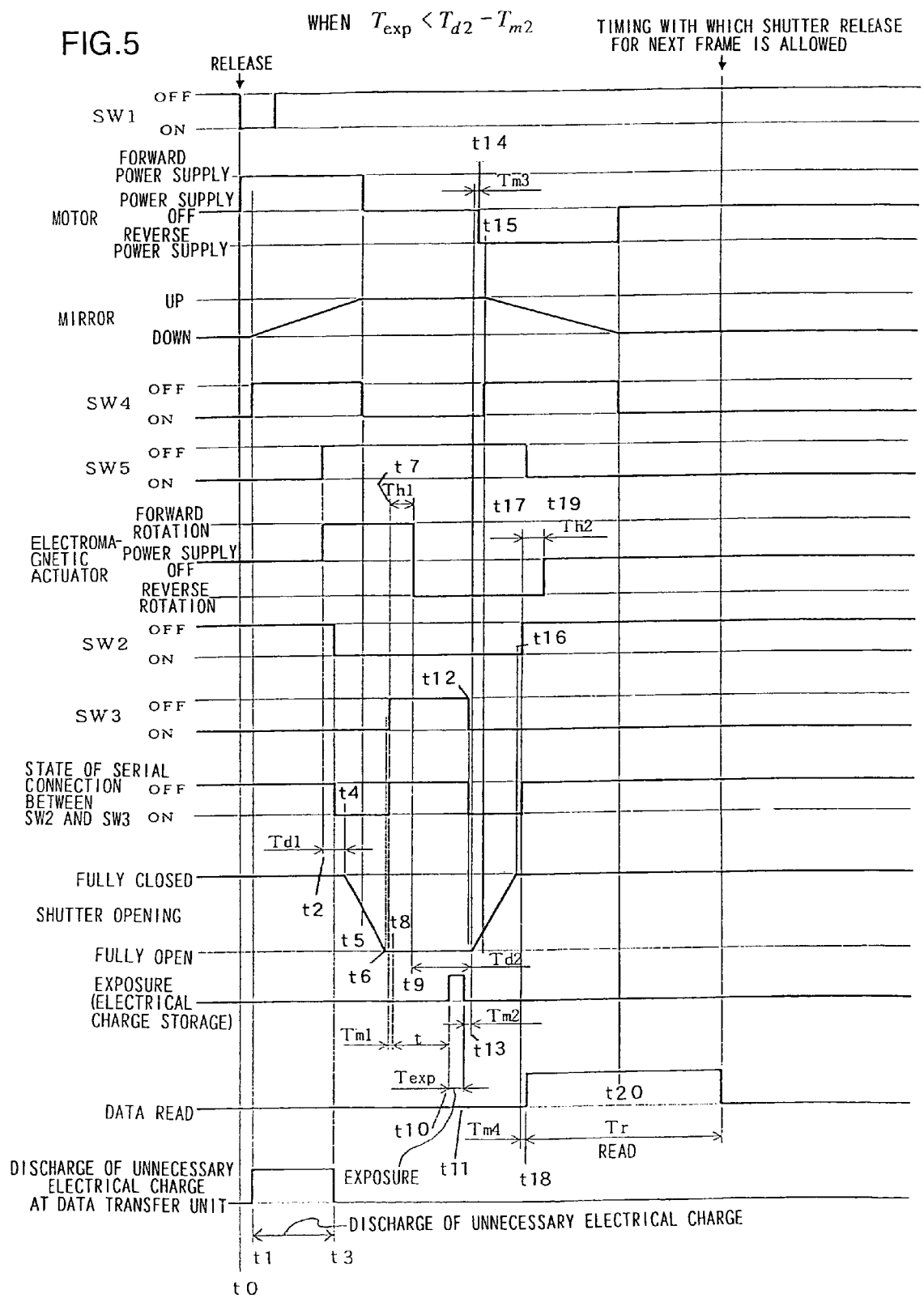
FIG. 5 shows the operational timing of the image-capturing sequence drive mechanism and the image-capturing element.
Figure 6:
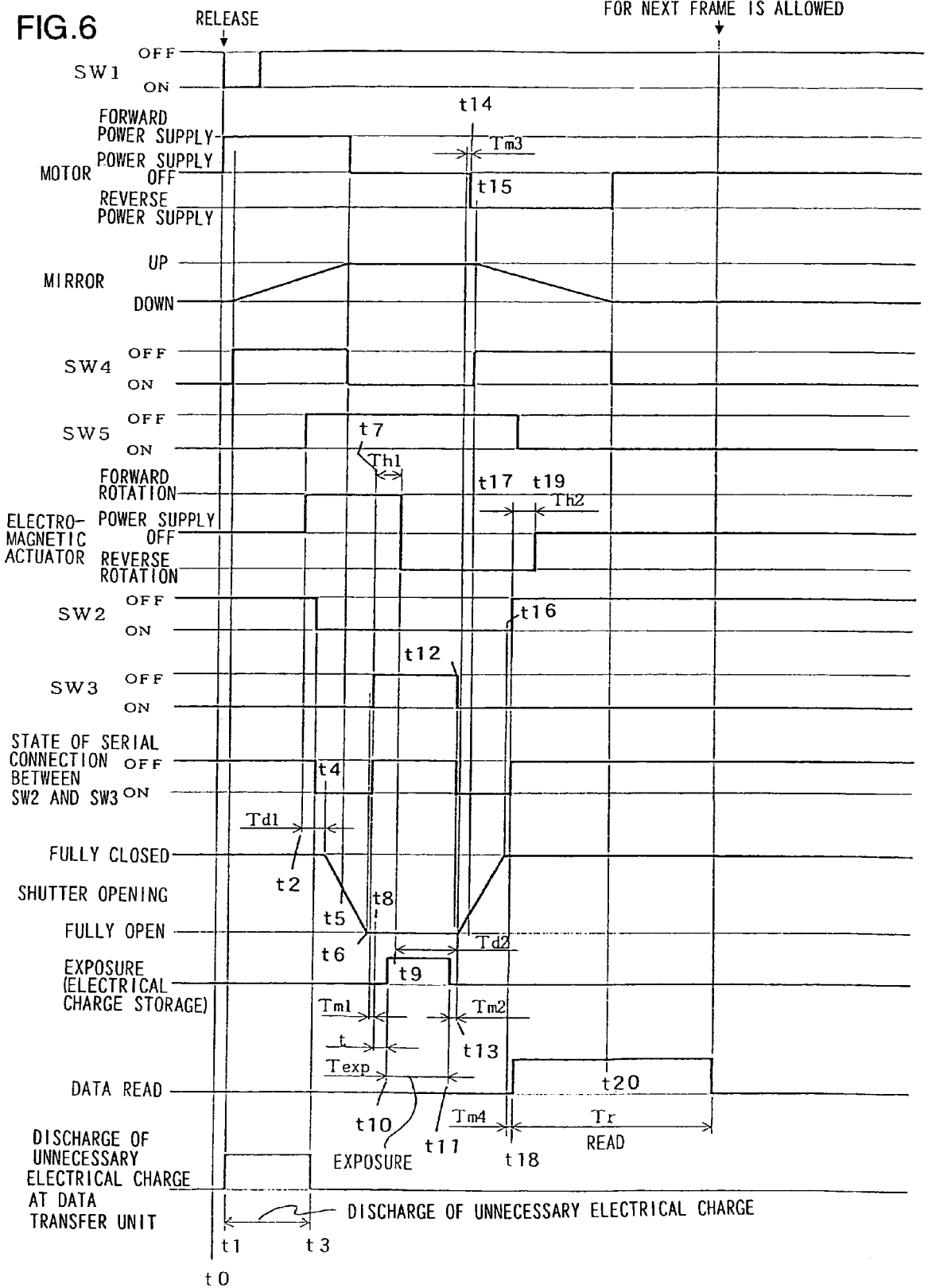
FIG. 6 shows the operational timing of the image-capturing sequence drive mechanism and the image-capturing element.
Figure 7:
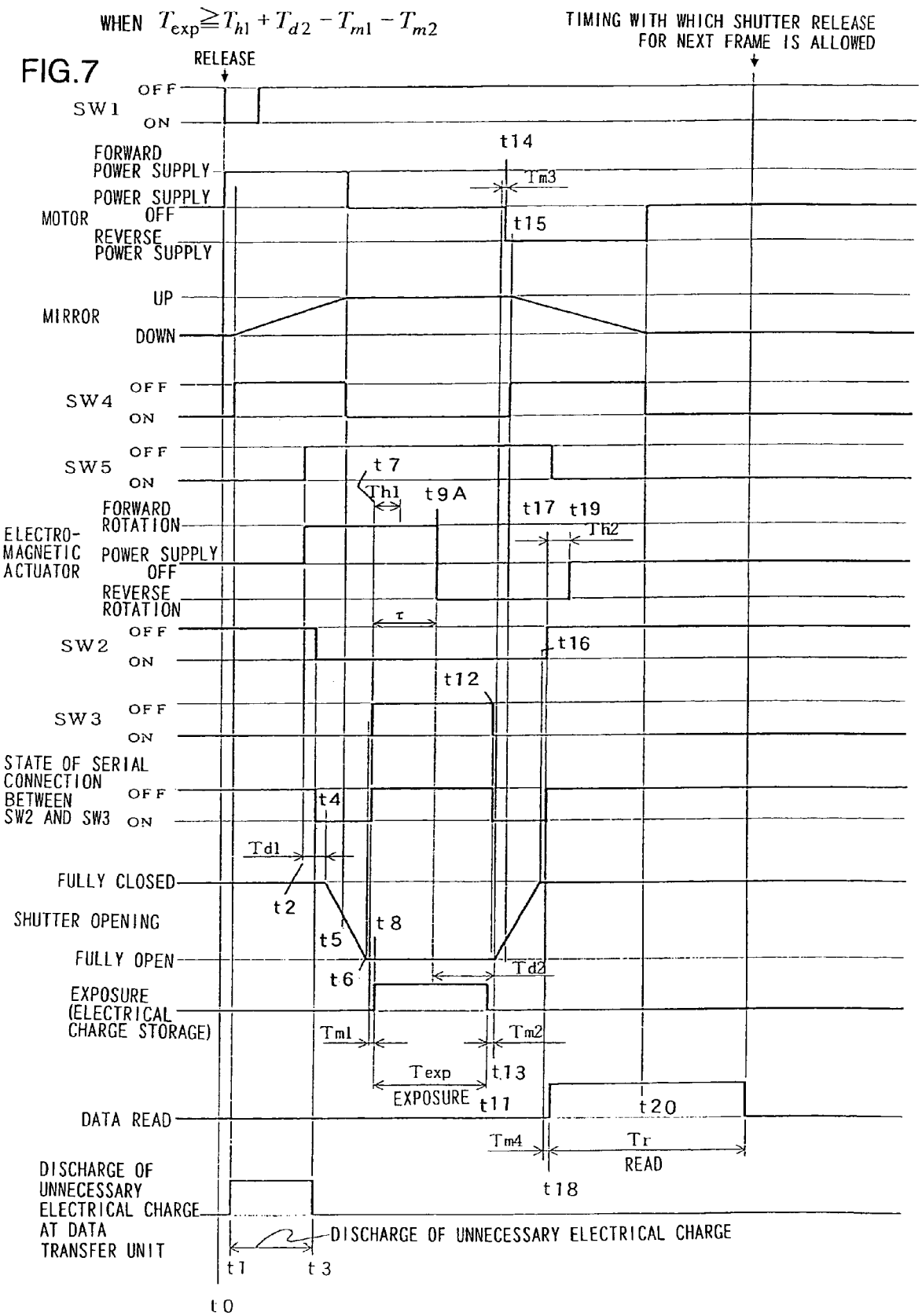
FIG. 7 shows the operational timing of the image-capturing sequence drive mechanism and the image-capturing element.

The present invention is characterized by the sequence control achieved with the image-capturing sequence drive mechanism. FIGS. 5 through 7 are timing charts illustrating the timing with which the image-capturing sequence drive mechanism and the image-capturing element 121 operate.

A signal "SW1" in FIG. 5 indicates the waveform of the operation signal generated from the shutter release switch. A signal "motor" indicates the waveform of the power supplied to the sequence motor. A signal "mirror" indicates the up/down state of the drive mechanism (not shown) of the mirror 61. Signals "SW4" and "SW5" indicate the waveforms of the signals generated from the respective sequence switches. A signal "electromagnetic actuator" indicates the waveform of the power supplied to the motor 12.

Signals "SW2" and "SW3" indicate the waveforms of the signals generated from the respective shutter switches. A signal "state of serial connection between SW2 and SW3" indicates the waveform of the serially synthesized signal achieved by synthesizing the signals "SW2" and "SW3". A waveform "shutter opening" indicates the open/closed state of the focal plane shutter 1. A signal "exposure" indicates the waveform of the electrical charge storage instruction for the image-capturing element 121. A signal "data read" indicates the waveform of a data (stored electrical charge) read instruction for reading data from the image-capturing element 121. A signal "discharge of unnecessary electrical charge" indicates the waveform of a pre-exposure discharge of electrical charge instruction for discharging electrical charges at the image-capturing element 121.

As an operation signal (from off to on) is generated at the shutter release switch at time point t0, a forward power supply to the sequence motor 111 which drives the mirror 61 and the aperture (not shown) starts. With the forward power supply, the sequence motor 111 is driven in the direction to raise the mirror and set the aperture. As the mirror starts to move upward at time point t1, the sequence switch SW4 is turned off. At time point t2, at which the mirror up operation and the aperture setting operation are still in progress, the sequence switch SW5 enters an off state, thereby starting a forward power supply to the motor (actuator) 12, and, as a result, the motor 12 rotates in the forward direction. Through the forward rotation of the motor 12, the blade set 3 is driven in the opening direction.

The length of the time delay Td1 following the start of the forward rotation of the motor 12 and is sustained until the blade set 3 starts to open the aperture 2a (at time point t4), may be, for instance, 9 msec. In other words, the time delay Td1 corresponds to a time period from a time point at which a drive signal for the forward rotation of the motor 12 is output to a time point at which the motor 12 actually starts to rotate. The shutter switch SW2 is structured so that it shifts from an off state to an on state at time point t3 which is approximately halfway through the time delay Td1. Accordingly, the signal "state of serial connection between SW2 and SW3" invariably enters an on state before the blade set 3 starts to open the aperture 2a, and thus, this time point t3 is used as the timing with which the discharge of unnecessary electrical charge ends.

As the mirror up operation ends at time point t5, the sequence switch SW4 is turned on, and the power supply to the sequence motor 111 is stopped with this timing.

The shutter switch SW3 is structured so that it shifts from an on state to an off state at time point t7 at which the blade set 3 has further moved in the opening direction slightly after opening the aperture 2a (at time point t6). When a predetermined length of time Th1 (e.g., 8 msec) elapses following time point t7, the power supply to the motor (actuator) 12 is switched from the forward power supply to the reverse power supply at time point t9. By further sustaining the positive power supply over the specific length of time Th1 beyond time point t7, the adverse effect of bounce and the like that occur when the blade set 3 becomes fully opened is minimized. Furthermore, the length of operating time over which the blade set 3 is subsequently driven to close the aperture (in particular, a time delay Td2 to be detailed later) is stabilized. It is to be noted that the time length Th1 is referred to as a holding time.

The time delay Td2 which follows the switch of the power supply (time point t9), e.g., the start of reverse rotation of the motor 12, and ends when the blade set 3 starts to close the aperture 2a (at time point t13) may be, for instance, 9 msec. This time delay Td2 occurs due to the delay with which the rotational drive force from the motor 12 is transmitted to the blade set 3. The time delay Td2 corresponds to a time period between a time point at which a drive signal for the reverse rotation of the motor 12 is output and a time point at which the motor 12 actually starts to rotate and the blade set 3 actually starts to move, i.e. these elements start to move physically. It is to be noted that the reverse rotation of the motor 12 drives the blade set 3 in the closing direction.

The shutter switch SW3 shifts from an off state to an on state at time point t12 at which the blade set 3 starts moving in the closing direction. The timing t13 described above corresponds to the time point at which the blade set 3 moves slightly in the closing direction and actually starts to close the aperture 2a.

A reverse power supply to the sequence motor 111 starts at time point t14 when a predetermined length of time Tm3 (e.g., 1 msec) elapses following time point t13. With the reverse power supply, the sequence motor 111 is driven in the direction to lower the mirror and open the aperture. As the mirror down operation starts at time point t15, the sequence switch SW4 enters an off state.

The shutter switch SW2 shifts from an on state to an off state at time point t17 by which the blade set 3 having closed the aperture 2a (at time point t16) has further moved in the closing direction slightly. After a predetermined length of time Th2 (e.g., 10 msec) elapses following time point t17, the reverse power supply to the motor (actuator) 12 is stopped at time point t19. By further sustaining the reverse power supply over the predetermined length of time Th2 following time point t17, the adverse effect of bounce or the like occurring as the blade set 3 stops moving is minimized and furthermore, the time required for opening drive of the blade set 3 for a subsequent photographing operation for the next frame (in particular, the time delay Td1 mentioned above) becomes more stable. It is to be noted that the length of time Th2 is referred to as "holding time".

As the mirror down operation is completed and the aperture is reset to the open state, the sequence switch SW4 shifts from an off state to an on state (at time point t20) and the reverse power supply to the sequence motor 111 stops.

The electrical charge storage (exposure) at the image-capturing element 121 is started at or after time point t8 which follows a pre-exposure time margin Tm1 (e.g., 1 msec) after time point t7 and it ends at time point t11 preceding time point t13 by a post-exposure time margin Tm2 (e.g., 1 msec). Accordingly, the length of time t to elapse between time point t8 and time point t10 at which the exposure actually starts is adjusted in correspondence to the setting for the exposure time (shutter speed) Texp.

The timing chart in FIG. 5 represents an example of the camera operation executed when Texp<(Td2−Tm2) is true. The operation executed when a longer exposure period is selected and (Td2−Tm2)≦Texp<(Th1+Td2−Tm1−Tm2) is true corresponds to the timing chart in FIG. 6 instead of the one in FIG. 5. In FIG. 6, the exposure starts at time point t10 which precedes time point t9. It is to be noted that the exposure ends at time point t11, as in the timing chart in FIG. 5.

The operation executed when an even longer exposure period is selected and Texp≧(Th1+Td2−Tm1−Tm2) is true corresponds to the timing chart in FIG. 7 instead of the one in FIG. 6. In FIG. 7, the timing with which the power supply to the motor (actuator) 12 is switched from the forward power supply to the reverse power supply is altered so that the switch occurs at time point t9A after a length of time τ elapses following time point t7. Namely, the forward power supply is further sustained over the length of time τ beyond time point t7. It is to be noted that the length of time τ, which is determined in correspondence to the currently selected exposure time (shutter speed) will be explained in further detail later. The exposure starts at time point t8 and ends at time point t11.

In each of FIGS. 5 through 7, the stored electrical charges are read out from the image-capturing element 121 over an electrical charge read time Tr starting at time point t18 which follows a pre-read time margin Tm4 (e.g., 1 msec) elapsing after time point t17. When the read time Tr has elapsed, a shutter release for the next frame is allowed.

The flow of the camera processing executed in the arithmetic operation circuit 101 of the electronic camera 51 is explained in reference to the flowchart presented in FIGS. 8 through 14. The program in conformance to which the processing is executed, as shown in the flowchart in FIG. 8, starts as a battery (not shown) is loaded into the electronic camera 51.

Figure 8:
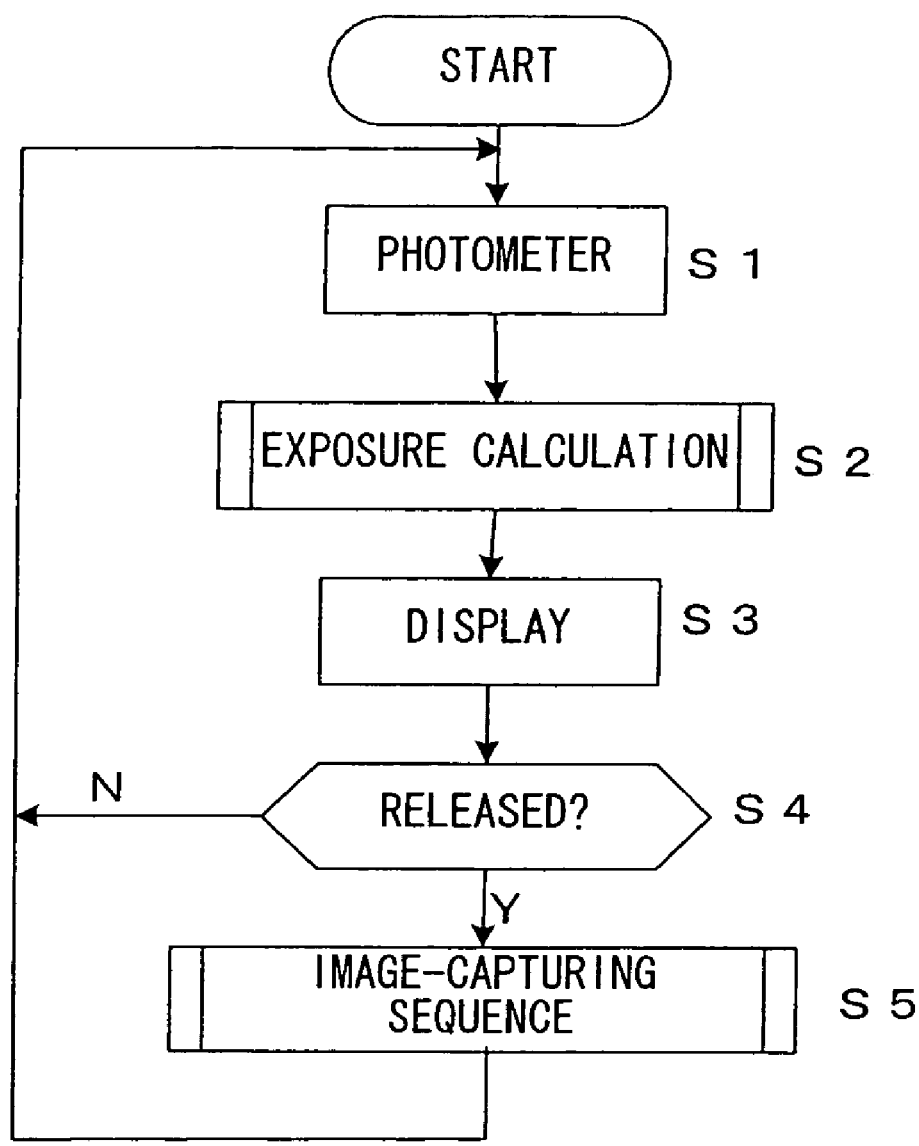
FIG. 8 presents a flowchart of the camera operation processing executed at the arithmetic operation circuit.

In step S1 in FIG. 8, a detection signal indicating a light quantity BV −3 of the light having passed through the photographic lens L is input from the photometering device 104 to the arithmetic operation circuit 101. The light quantity BV is indicated as the apex value of the subject brightness. The "−3" in BV −3 accounts for the apex value 3 corresponding to the full open aperture value F 2.8 of the photographic lens L described earlier. The arithmetic operation circuit 101 calculates the subject brightness BV by adding 3 to the detection value obtained at the photometering device 104.

In step S2, the arithmetic operation circuit 101 executes exposure calculation processing based upon the value representing the subject brightness BV and the sensitivity setting SV=5 (equivalent to ISO 100), and then they operation proceeds to step S3. The exposure calculation processing is to be detailed later.

In step S3, the arithmetic operation circuit 101 engages the display device 103 to bring up a display indicating the values of a control aperture value AVc and a control shutter speed TVc, before the operation proceeds to step S4. The control aperture value AVc and the control shutter speed TVc are calculated in the exposure calculation processing.

In step S4, the arithmetic operation circuit 101 makes a decision as to whether or not the shutter release switch SW1 has been turned on. The arithmetic operation circuit 101 makes an affirmative decision in step S4 if an operation signal has been input from the shutter release switch SW1, and in this case, the operation proceeds to step S5. The arithmetic operation circuit 101 makes a negative decision in step S4 if no operation signal has been input from the shutter release switch SW1, and the operation returns to step S1.

In step 5, the arithmetic operation circuit 101 executes image capturing sequence processing before the operation returns to step S1. The image capturing sequence processing is to be explained in detail later.

Figure 9:
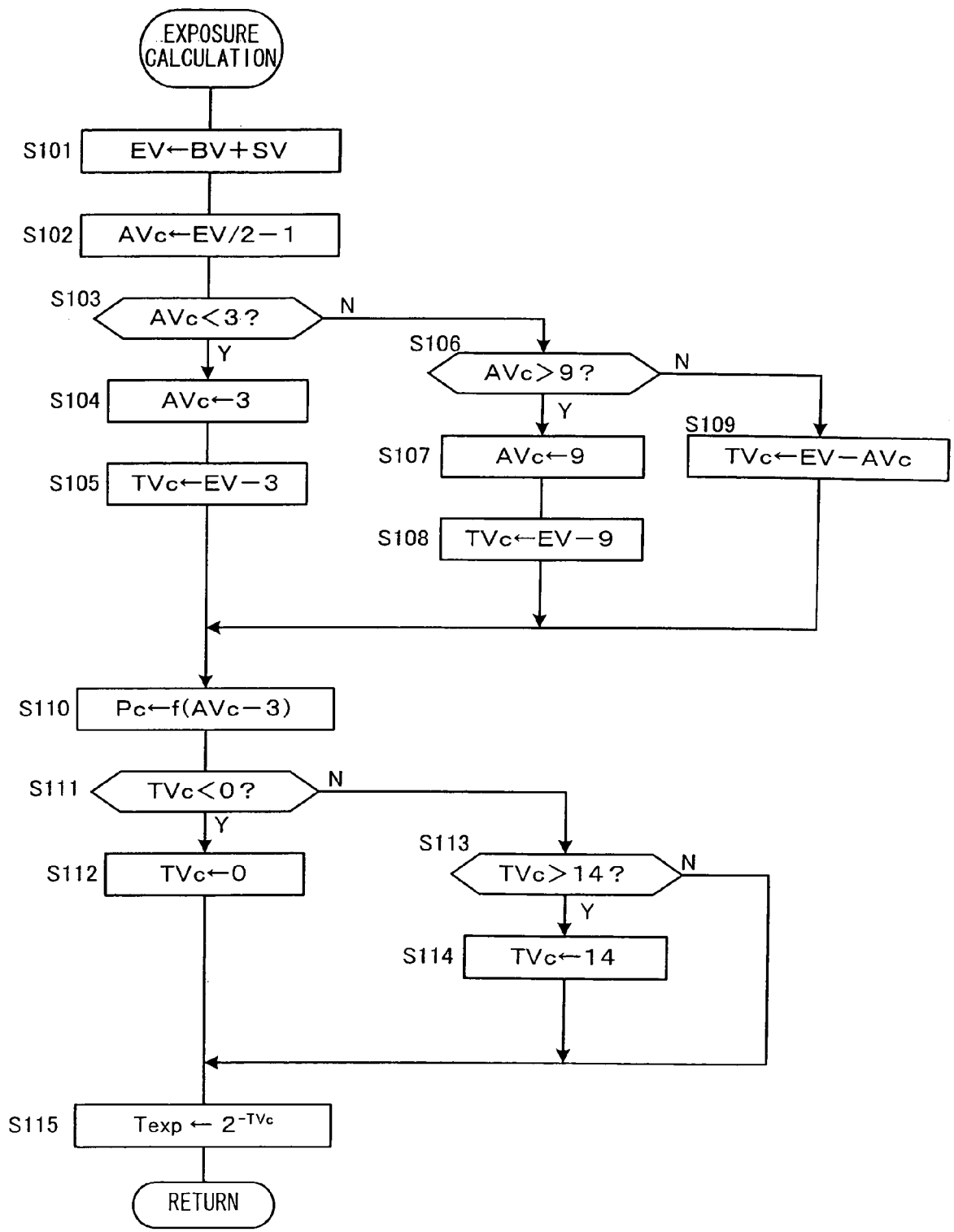
FIG. 9 presents a flowchart of the camera operation processing executed at the arithmetic operation circuit.
Figure 10:
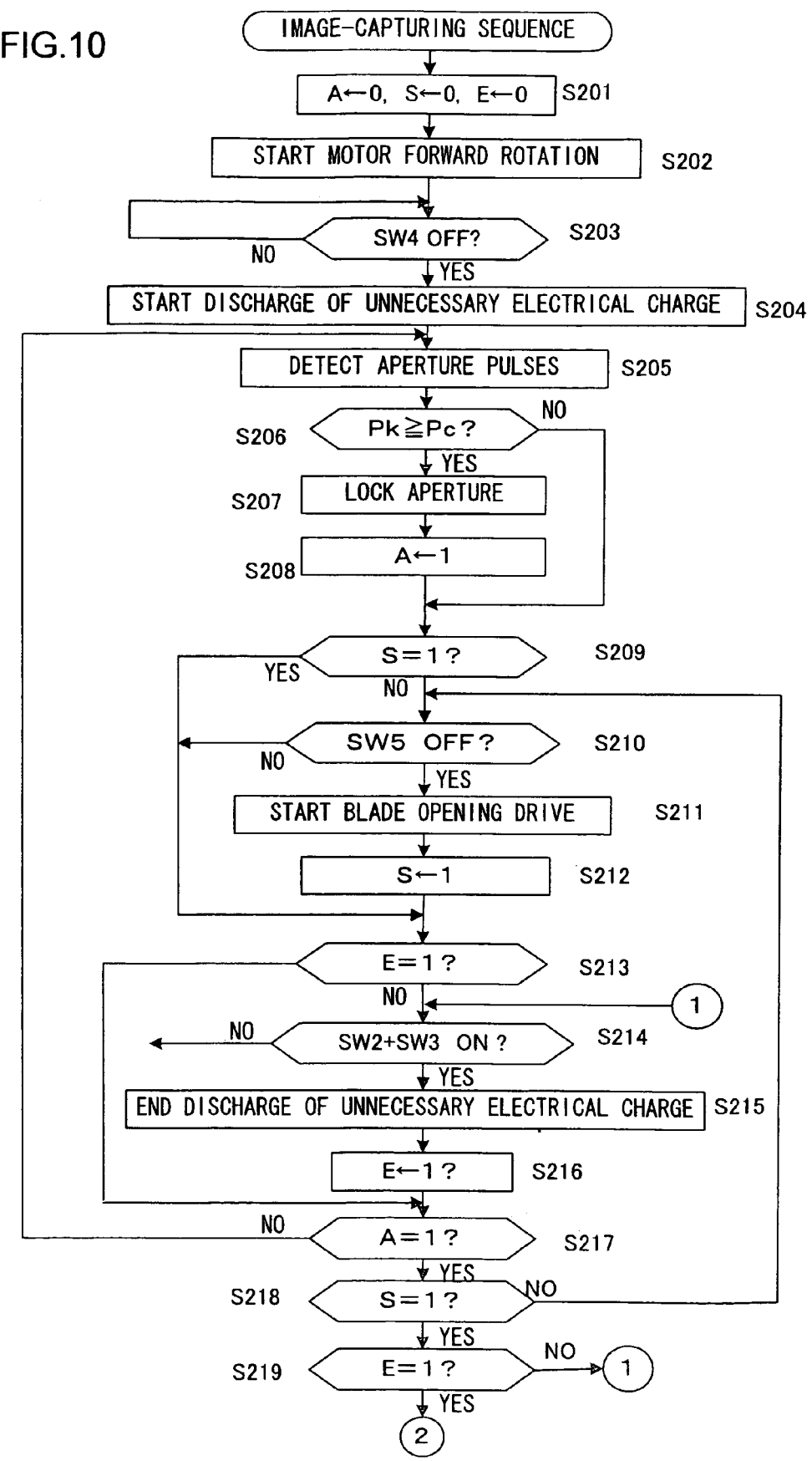
FIG. 10 presents a flowchart of the image-capturing sequence processing.

The flow of the exposure calculation processing is now explained in reference to the flowchart presented in FIG. 9. In step S101 in FIG. 9, the arithmetic operation circuit 101 calculates an exposure value EV for achieving correct exposure by adding the value of the sensitivity setting SV (=5) to the subject brightness BV calculated in step S1. In step S102, the arithmetic operation circuit 101 calculates through an arithmetic operation an aperture value at which the correct exposure is achieved. More specifically, it calculates the control aperture value AVc by dividing the exposure value EV by 2 and then subtracting 1 from the quotient.

In step S103, the arithmetic operation circuit 101 makes a decision as to whether or not the control aperture value AVc is smaller than the full open aperture value 3 (F2.8), i.e., whether or not the aperture diameter is greater than the full open aperture diameter). The arithmetic operation circuit 101 makes an affirmative decision in step S103 if the control aperture value AVc is smaller than 3 to proceed to step S104, whereas it makes a negative decision in step S103 if AVc<3 is not true to proceed to step S106.

In step S104, the arithmetic operation circuit 101 sets the control aperture value AVc equal to the full open aperture value 3, and then they operation proceeds to step S105. In step S105, the arithmetic operation circuit 101 sets the control shutter speed TVc to a value obtained by subtracting the control aperture value 3 from the exposure value EV calculated in step S101 before the operation proceeds to step S110.

In step S106, the arithmetic operation circuit 101 makes a decision as to whether or not the control aperture value AVc is greater than the smallest diameter aperture value 9 (i.e., whether or not the aperture diameter is smaller than the minimum aperture diameter). The arithmetic operation circuit 101 makes an affirmative decision in step S106 if the control aperture value AVc is greater than 9 to proceed to step S107, whereas it makes a negative decision in step S106 if AVc>9 is not true to proceed to step S109.

In step S107, the arithmetic operation circuit 101 sets the control aperture value AVc equal to the minimum diameter aperture value 9, and then the operation proceeds to step S108. In step S108, the arithmetic operation circuit 101 sets the control shutter speed TVc to a value obtained by subtracting the control aperture value 9 from the exposure value EV calculated in step S101 before the operation proceeds to step S110. In the processing executed in steps S103 through S108 as described above, control is implemented so as to set the control aperture value to 3 or 9 if the control aperture value AVc is smaller than the full open aperture value 3 or exceeds the minimum diameter aperture value 9.

In step S109, the arithmetic operation circuit 101 sets the control shutter speed TVc to a value obtained by subtracting the control aperture value AVc from the exposure value EV calculated in step S101 before the operation proceeds to step S110. In step S110, the arithmetic operation circuit 101 calculates the number of control aperture pulses Pc as a function of the number of aperture setting stages (AVc−3). Namely, it calculates Pc as f(AVc−3). In principle, the number of aperture setting stages and the number of aperture pulses detected by the aperture position detection device 112 have a proportional relation to each other. However, since a greater number of detected aperture pulses is output in the vicinity of the aperture full open setting, the number of control aperture pulses Pc is calculated as a function of the number of aperture setting stages (AVc−3).

In step S111, the arithmetic operation circuit 101 makes a decision as to whether or not the control shutter speed TVc is less than 0 (i.e., whether or not the shutter speed is slower than 1 sec). The arithmetic operation circuit 101 makes an affirmative decision in step S111 if the control shutter speed TVc is less than 0 to proceed to step S112, whereas it makes a negative decision in step S111 if TVc is <0 is not true to proceed to step S113.

In step S112, the arithmetic operation circuit 101 sets the control shutter speed TVc to 0, and then the operation proceeds to step S115. In step S113, the arithmetic operation circuit 101 makes a decision as to whether or not the control shutter speed TVc is greater than 14 (i.e., whether or not the shutter speed is higher than 1/16,000 sec). The arithmetic operation circuit 101 makes an affirmative decision in step S113 if the control shutter speed TVc is greater than 14 to proceed to step S114, whereas it makes a negative decision in step S113 if TVc>14 is not true to proceed to step S115. In step S114, the arithmetic operation circuit 101 sets the control shutter speed TVc to 14 and then the operation proceeds to step S115. In the processing executed in steps S111 through S114 described above, control is implemented so as to set the control shutter speed to 0 (1 sec) or 14 (1/16,000 sec) if the control shutter speed TVc is outside the electronic shutter speed range (1 sec through 1/16,000 sec) of the image-capturing element 121 either on the lower side or on the higher side.

In step S115, the arithmetic operation circuit 101 calculates the length of exposure time $Texp=2^{-TVc}$, and then the processing in FIG. 9 ends.

The flow of the image capturing sequence processing is now explained in reference to the flowcharts presented in FIGS. 10 through 14. In step S201 in FIG. 10, the arithmetic operation circuit 101 selects the following initial settings. Namely, it sets flags A, S and E all to 0. The flag A is switched to 1 as the aperture becomes held at the control aperture value AVc. The flag S is switched to 1 as drive of the blade set 3 at the shutter 1 starts. The flag E is switched to 1 as discharge of unnecessary electrical charges at the image-capturing element 101 ends.

In step S202, the arithmetic operation circuit 101 issues a command for the motor drive circuit 110 to start forward rotation of the sequence motor 111, and then the operation proceeds to step S203. In response, a mirror-up operation starts and an aperture setting operation starts. In step S203, the arithmetic operation circuit 101 makes a decision as to whether or not the sequence switch SW4 is in an off state. The arithmetic operation circuit 101 makes an affirmative decision in step S203 if the signal from the sequence switch SW4 is at H level to proceed to step S204, whereas it makes a negative decision in step S203 if the signal from the sequence switch SW4 is at L level to repeatedly execute this decision-making processing. It is to be noted that while the mirror-up operation has started by the time when the operation proceeds to step S204, the aperture is yet to be held and the drive of the blade set 3 has not yet started at his point.

In step S204, the arithmetic operation circuit 101 issues a command for the timing circuit 124 to start discharge of unnecessary electrical charges at the data-transfer unit of the image-capturing element 121, and then the operation proceeds to step S205.

In step S205, the arithmetic operation circuit 101 counts detection signals (aperture pulses) input from the aperture position detection device 112 and designates the count value as the number of aperture pulses Pk, before the operation proceeds to step S206. In step S206, the arithmetic operation circuit 101 makes a decision as to whether or not a relationship expressed as Pk≧Pc is achieved between the number of aperture pulses Pk and the number of pulses Pc corresponding to the control aperture value AVc. The control aperture value AVc is obtained through the exposure calculation processing explained earlier. The arithmetic operation circuit 101 makes an affirmative decision in step S206 if Pk≧Pc is true to proceed to step S207, whereas it makes a negative decision in step S206 if Pk≧Pc is not true to proceed to step S209.

In step S207, the arithmetic operation circuit 101 outputs a command for the aperture holding device 113 to hold the aperture and then the operation proceeds to step S208. In response, the aperture setting operation stops. In step S208, the arithmetic operation circuit 101 sets the flag A to 1, and then the operation proceeds to step S209. In step S209, the arithmetic operation circuit 101 makes a decision as to whether or not the flag S is currently set to 1. The arithmetic operation circuit 101 makes an affirmative decision in step S209 if S=1 to proceed to step S213, whereas it makes a negative decision in step S209 if S=0 to proceed to step S210. The operation proceeds to step S213 on the assumption that the motor 12 is already rotating forward in order to drive open the blade set 3 at the shutter 1. The operation proceeds to step S210 on the assumption that the motor 12 is not yet engaged in forward rotation.

In step S210, the arithmetic operation circuit 101 makes a decision as to whether or not the sequence switch SW5 is in an off state. The arithmetic operation circuit 101 makes an affirmative decision in step S210 if the signal from the sequence switch SW5 is at H level to proceed to step S211, whereas it makes a negative decision in step S210 if the signal from the sequence switch SW5 is at L level, to proceed to step S213. The operation proceeds to step S211 on the assumption that the motor 12 for the shutter 1 is engaged in a forward rotation at this time, whereas the operation proceeds to step S213 on the assumption that the motor 12 is not yet be engaged in forward rotation.

In step S211, the arithmetic operation circuit 101 outputs a command for the shutter drive circuit 108 to start a forward rotation of the motor 12 and then the operation proceeds to step S212. In response, opening drive of the blade set 3 at the shutter 1 starts to open the aperture 2a. In step S212, the arithmetic operation circuit 101 sets the flag S to 1 and then the operation proceeds to step S213.

In step S213, the arithmetic operation circuit 101 makes a decision as to whether or not the flag E is currently set to 1. The arithmetic operation circuit 101 makes an affirmative decision in step S213 if E=1 to proceed to step S217, whereas it makes a negative decision in step S213 if E=0 to proceed to step S214. The operation proceeds to step S217 on the assumption that the processing for discharging the unnecessary electrical charges at the image-capturing element 121 has ended. The operation proceeds to step S214 on the assumption that the processing for discharging the unnecessary electrical charges at the image-capturing element 121 has not yet ended.

In step S214, the arithmetic operation circuit 101 makes a decision as to whether or not the output of the serial connection achieved with the shutter switches SW2 and SW3 is in an on state. The arithmetic operation circuit 101 makes an affirmative decision in step S214 if the signal input to the input port for the shutter switches SW2 and SW3 is at L level to proceed to step S215. This instance manifests between time points t3 and t4 explained earlier and the arithmetic operation circuit 101 judges that the start of the opening drive of the blade set 3 at the shutter 1 is imminent.

The arithmetic operation circuit 101 makes a negative decision in step S214 if the signal input to the input port for the shutter switches SW2 and SW3 is at H level to proceed to step S217. This instance manifests prior to time point t3 explained earlier and the arithmetic operation circuit judges that the opening drive of the blade set 3 at the shutter 1 is not to be started yet.

In step S215, the arithmetic operation circuit 101 outputs a command for the timing circuit 124 to end the discharge of the unnecessary electrical charges at the data transfer unit of the image-capturing element 121 before the operation proceeds to step S216.

In step S216, the arithmetic operation circuit 101 sets the flag E to 1 and then the operation proceeds to step S217. In step S217, the arithmetic operation circuit 101 makes a decision as to whether or not the flag A is currently set to 1. The arithmetic operation circuit 101 makes an affirmative decision in step S217 if A=1 to proceed to step S218, whereas it makes a negative decision in step S217 if A=0 to return to step S205. The operation proceeds to step S218 on the assumption that the aperture is already held by the aperture holding device 113, whereas the operation returns to step S205 on the assumption that the aperture holding operation by the aperture holding device 113 has not yet been completed.

In step S218, the arithmetic operation circuit 101 makes a decision as to whether or not the flag S is currently set to 1. The arithmetic operation circuit 101 makes an affirmative decision in step S218 if S=1 to proceed to step S219, whereas it makes a negative decision in step S218 if S=0 to return to step S210. The operation proceeds to step S219 on the assumption that the motor 12 is already rotating forward for opening drive of the blade set 3 at the shutter 1. The operation returns to step S210 on the assumption that the motor 12 is not yet engaged in forward rotation.

In step S219, the arithmetic operation circuit 101 makes a decision as to whether or not the flag E is currently set to 1. The arithmetic operation circuit 101 makes an affirmative decision in step S219 if E=1 to proceed to step S221 in FIG. 11, whereas it makes a negative decision in step S219 if E=0 to return to step S214. The operation proceeds to step S221 on the assumption that the processing for discharging the unnecessary electrical charges at the image-capturing element 121 has ended. The operation returns to step S214 on the assumption that the processing for discharging the unnecessary electrical charges at the image-capturing element 121 has not yet ended.

Figure 11:
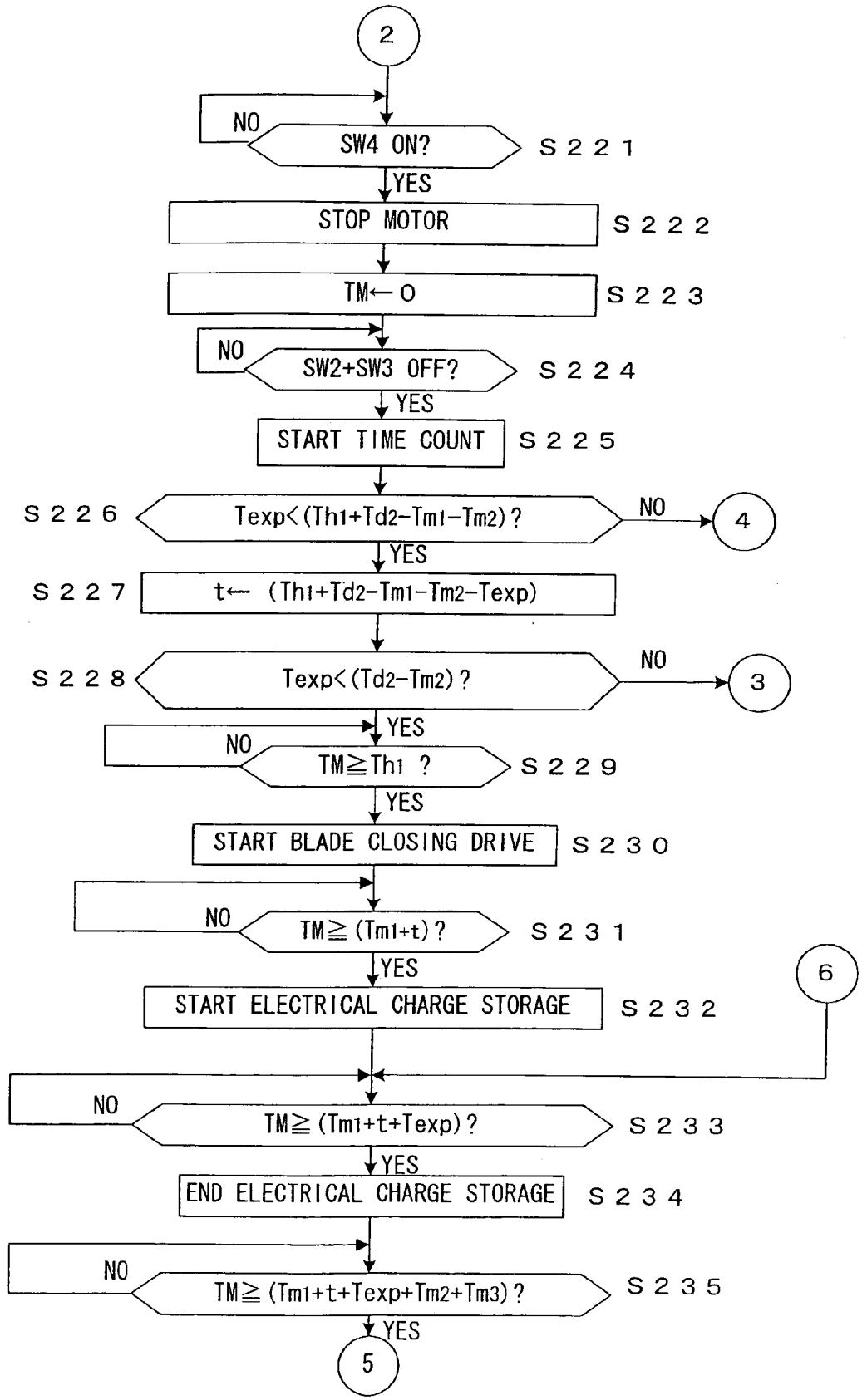
FIG. 11 presents a flowchart of the image-capturing sequence processing.

In step S221 in FIG. 11, the arithmetic operation circuit 101 makes a decision as to whether or not the sequence switch SW4 is in an on state. The arithmetic operation circuit 101 makes an affirmative decision in step S221 if the signal from the sequence switch SW4 is at L level to proceed to step S222, whereas it makes a negative decision in step S221 if the signal from the sequence switch SW4 is at H level to repeatedly execute this decision-making processing. The operation proceeds to step S222 when the mirror-up operation has been completed. The decision-making processing is repeatedly executed if the mirror-up operation is still in progress.

In step S222, the arithmetic operation circuit 101 outputs a command for the motor drive circuit 110 to stop the forward rotation of the sequence motor 111. It is to be noted that through this stop processing, a break such as a reverse power supply brake or a short brake is applied to stop the sequence motor 111 instantaneously. Accordingly, the extent of the overrun can be disregarded. In addition, the image capturing sequence drive mechanism is structured so as to complete the aperture holding operation by the aperture holding device 113 before it is judged in step S221 that the mirror-up operation has ended.

In step S223, the arithmetic operation circuit 101 sets the time count TM at the timer circuit 101t to 0 before the operation proceeds to step S224. It is to be noted that this time count TM is used in various types of time control including the control of the length of time over which electrical charges are stored at the image-capturing element 121, i.e., the time count for the electronic shutter.

In step S224, the arithmetic operation circuit 101 makes a decision as to whether or not the output of the serial connection achieved with the shutter switches SW2 and SW3 is in an off state. The arithmetic operation circuit 101 makes an affirmative decision in step S224 if the signal input to the input port for the shutter switches SW2 and SW3 is at H level to proceed to step S225. In this instance, the arithmetic operation circuit judges that the aperture 2a is opened to a full open state with the blade set 3 at the shutter 1. If, on the other hand, the signal input to the input port for the shutter switches SW2 and SW3 is at L level, the arithmetic operation circuit 101 makes a negative decision in step S224 to repeatedly execute this decision-making processing. In this case, the arithmetic operation circuit judges that the blade set 3 at the shutter 1 is currently engaged in the process of opening the aperture 2a.

In step S225, the arithmetic operation circuit 101 starts a time count at the timer circuit 101t before the operation proceeds to step S226.

In step S226, the arithmetic operation circuit 101 makes a decision as to whether or not the length of exposure time Texp is less than (Th1+Td2−Tm1−Tm2). The arithmetic operation circuit 101 makes an affirmative decision in step S226 if Texp<(Th1+Td2−Tm1−Tm2) to proceed to step S227, whereas it makes a negative decision in step S226 if Texp<(Th1+Td2−Tm1−Tm2) is not true to proceed to step S271 in FIG. 14. The timing charts in FIGS. 5 and 6 correspond to the operation which proceeds to step S227, whereas the timing chart in FIG. 7 corresponds to the operation which proceeds to step S271.

In step S227, the arithmetic operation circuit 101 substitutes (Th1+Td2−Tm1−Tm2−Texp) for the parameter t (length of time t in FIGS. 5 and 6) before the operation proceeds to step S228.

In step S228, the arithmetic operation circuit 101 makes a decision as to whether or not the length of exposure time Texp is less than (Td2−Tm2). The arithmetic operation circuit 101 makes an affirmative decision in step S228 if Texp<(Td2−Tm2) to proceed to step S229, whereas it makes a negative decision in step S228 if Texp<(Td2−Tm2) is not true to proceed to step S261 in FIG. 13. The timing chart in FIG. 5 corresponds to the operation which proceeds to step S229, whereas the timing chart in FIG. 6 corresponds to the operation which proceeds to step S261.

In step S229, the arithmetic operation circuit 101 makes a decision as to whether or not TM≧Th1 is true with regard to the time count TM started in step S225. The arithmetic operation circuit 101 makes an affirmative decision in step S229 if TM≧Th1 is true to proceed to step S230, whereas it makes a negative decision in step S229 if TM≧Th1 is not true to repeatedly execute this decision making processing. The operation proceeds to step S230 on the assumption that the holding time Th1 has elapsed.

In step S230, the arithmetic operation circuit 101 outputs a command for the shutter drive circuit 108 to start a reverse rotation of the motor 12 before the operation proceeds to step S231. In response, closing drive for closing the blade set 3 at the shutter 1 starts to close the aperture 2a with the blade set 3. In step S231, the arithmetic operation circuit 101 makes a decision as to whether or not TM≧(Tm1+t) is true with regard to the time count TM started in step S225. The arithmetic operation circuit 101 makes an affirmative decision in step S231 if TM≧(Tm1+t) is true to proceed to step S232, whereas it makes a negative decision in step S231 if TM≧(Tm1+t) is not true to repeatedly execute this decision-making processing. The operation proceeds to step S232 on the assumption that the exposure should be started at this time (time point t10 in FIG. 5).

In step S232, the arithmetic operation circuit 101 outputs a command for the timing circuit 124 to start electrical charge storage at the image-capturing element 121 and then the operation proceeds to step S233. In step S233, the arithmetic operation circuit 101 makes a decision as to whether or not TM≧(Tm1+t+Texp) is true with regard to the time count TM started in step S225. The arithmetic operation circuit 101 makes an affirmative decision in step S233 if TM≧(Tm1+t+Texp) is true to proceed to step S234, whereas it makes a negative decision in step S233 if TM≧(Tm1+t+Texp) is not true to repeatedly execute this decision-making processing. The operation proceeds to step S234 on the assumption that the exposure is to end at this time (time point t11 in FIG. 5).

In step S234, the arithmetic operation circuit 101 outputs a command for the timing circuit 124 to end the electrical charge storage at the image-capturing element 121, before the operation proceeds to step S235. In step S233, the arithmetic operation circuit 101 makes a decision as to whether or not TM≧(Tm1+t+Texp+Tm2+Tm3) is true with regard to the time count TM started in step S225. The arithmetic operation circuit 101 makes an affirmative decision in step S235 if TM≧(Tm1+t+Texp+Tm2+Tm3) is true to proceed to step S241 in FIG. 12, whereas it makes a negative decision in step S235 if TM≧(Tm1+t+Texp+Tm2+Tm3) is not true to repeatedly execute this decision-making processing. The operation proceeds to step S241 on the assumption that a mirror-down operation should start at this time and also an open aperture reset operation should start at this time (time point t14 in FIG. 5).

Figure 12:
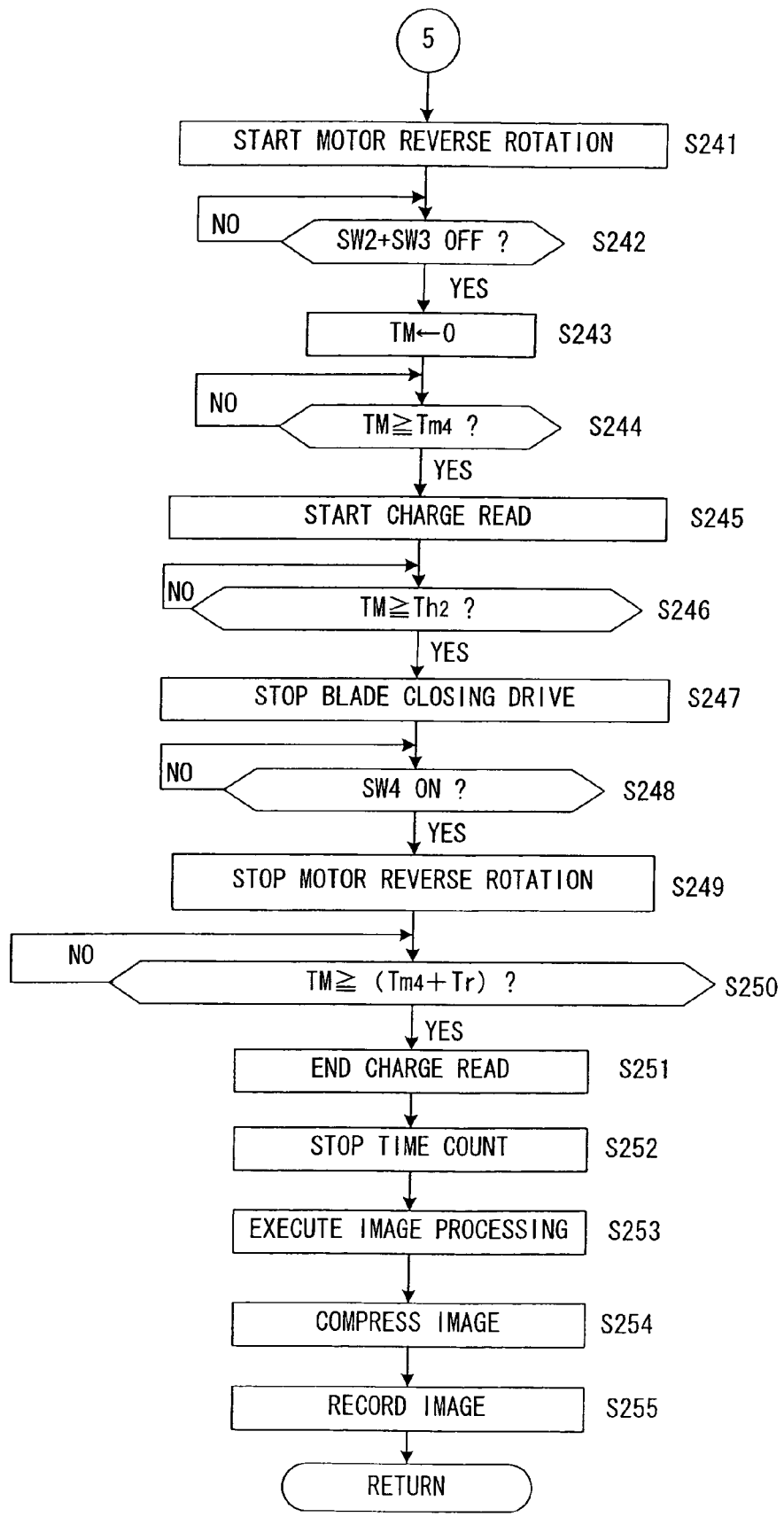
FIG. 12 presents a flowchart of the image-capturing sequence processing.

In step S241 in FIG. 12, the arithmetic operation circuit 101 outputs a command for the motor drive circuit 110 to start a reverse rotation of the sequence motor 111, and then the operation proceeds to step S242. In step S242, the arithmetic operation circuit 101 makes a decision as to whether or not the output of the serial connection achieved with the shutter switches SW2 and SW3 is in an off state. The arithmetic operation circuit 101 makes an affirmative decision in step S242 if the signal input to the input port for the shutter switches SW2 and SW3 is at H level to proceed to step S243. In this instance, the arithmetic operation circuit judges that the aperture 2a is completely closed with the blade set 3 at the shutter 1. If, on the other hand, the signal input to the input port for the shutter switches SW2 and SW3 is at L level, the arithmetic operation circuit 101 makes a negative decision in step S242 to repeatedly execute this decision-making processing. In this case, the arithmetic operation circuit judges that the blade set 3 at the shutter 1 is currently engaged in the process of closing the aperture 2a.

In step S243, the arithmetic operation circuit 101 sets the time count TM at the timer circuit 101t to 0 before the operation proceeds to step S244. In response, the time count TM is cleared to 0 at time point t17 in FIG. 5. It is to be noted that the time is continuously counted following the reset.

In step S244, the arithmetic operation circuit 101 makes a decision as to whether or not TM≧Tm4 is true with regard to the pre-read time margin Tm4. The arithmetic operation circuit 101 makes an affirmative decision in step S244 if TM≧Tm4 is true to proceed to step S245, whereas it makes a negative decision in step S244 if TM≧Tm4 is not true to repeatedly execute this decision-making processing. The operation proceeds to step S245 on the assumption that the pre-read time margin Tm4 has elapsed after the aperture 2a was completely closed by the blade set 3.

In step S245, the arithmetic operation circuit 101 outputs a command for the timing circuit 124 to start a read of the image signals from the image-capturing element 121, and then the operation proceeds to step S246. In response, the image signals constituted of the electrical charges stored at the image-capturing 121 are output from the image-capturing element 121 and the analog image signals thus outputs are converted to digital signals at the A/D conversion circuit 122.

In step S246, the arithmetic operation circuit 101 makes a decision as to whether or not Tm≧Th2 is true. The arithmetic operation circuit 101 makes an affirmative decision in step S246 if Tm≧Th2 is true to proceed to step S247, whereas it makes a negative decision in step S246 if Tm≧Th2 is not true to repeatedly execute this decision-making processing. The operation proceeds to step S247 on the assumption that the holding time Th2 has elapsed.

In step S247, the arithmetic operation circuit 101 outputs a command for the shutter drive circuit 108 to stop the reverse rotation of the motor 12, and then the operation proceeds to step S248. In response, the closing drive for closing the aperture 2a with the blade set 3 at the shutter 1 ends. In step S248, the arithmetic operation circuit 101 makes a decision as to whether or not the sequence switch SW4 is in an on state. The arithmetic operation circuit 101 makes an affirmative decision in step S248 if the signal from the sequence switch SW4 is at L level to proceed to step S249, whereas it makes a negative decision in step S248 if the signal from the sequence switch SW4 is at H level to repeatedly execute this decision-making processing. The operation proceeds to step S249 if the mirror-down operation has been completed and the aperture has been reset to an open state.

In step S249, the arithmetic operation circuit 101 outputs a command for the motor drive circuit 110 to stop the reverse rotation of the sequence motor 111. It is to be noted that through this stop processing, a break such as a reverse power supply brake or a short brake is applied to stop the sequence motor 111 instantaneously. Accordingly, the extent of the overrun can be disregarded.

The sequence switch SW4 shifts into an on state (at time point t20 in FIG. 5) later than the time point (t17 in FIG. 5) at which the output of the serial connection achieved by the shutter switches SW2 and SW3 shifts into an off state but before the read time Tr during which the electrical charges stored at the image-capturing element 121 are read out elapses.

In step S250, the arithmetic operation circuit 101 makes a decision as to whether or not TM≧(Tm4+Tr) is true with regard to the time count TM having been reset in step S243. The arithmetic operation circuit 101 makes an affirmative decision in step S250 if TM≧(Tm4+Tr) is true to proceed to step S251, whereas it makes a negative decision in step S250 if TM≧(Tm4+Tr) is not true to repeatedly execute this decision-making processing. The operation proceeds to step S251 on the assumption that the data read is to end at this time.

In step S251, the arithmetic operation circuit 101 outputs a command for the timing circuit 124 to stop the read of the image signals from the image-capturing element 121 and then the operation proceeds to step S252. In step S252, the arithmetic operation circuit 101 stops the time count by the timer circuit 101t before the operation proceeds to step S253.

In step S253, the arithmetic operation circuit 101 starts image processing such as white balance adjustment, edge compensation and gamma correction by engaging the image processing circuit 123 in operation before proceeding to step S254. In step S254, the arithmetic operation circuit 101 has the image processing circuit 123 start image compression processing before proceeding to step S255. In response, the image processing circuit 123 starts the image compression processing and also processing for storing the image data having undergone the compression processing into the buffer memory 125.

In step S255, the arithmetic operation circuit 101 executes processing for recording the compressed image data stored in the buffer memory 125 into the recording medium 126, thereby ending the processing in FIG. 12, and subsequently, the operation returns to step S1 in FIG. 8. The sequence of photograph processing thus ends.

Figure 13:
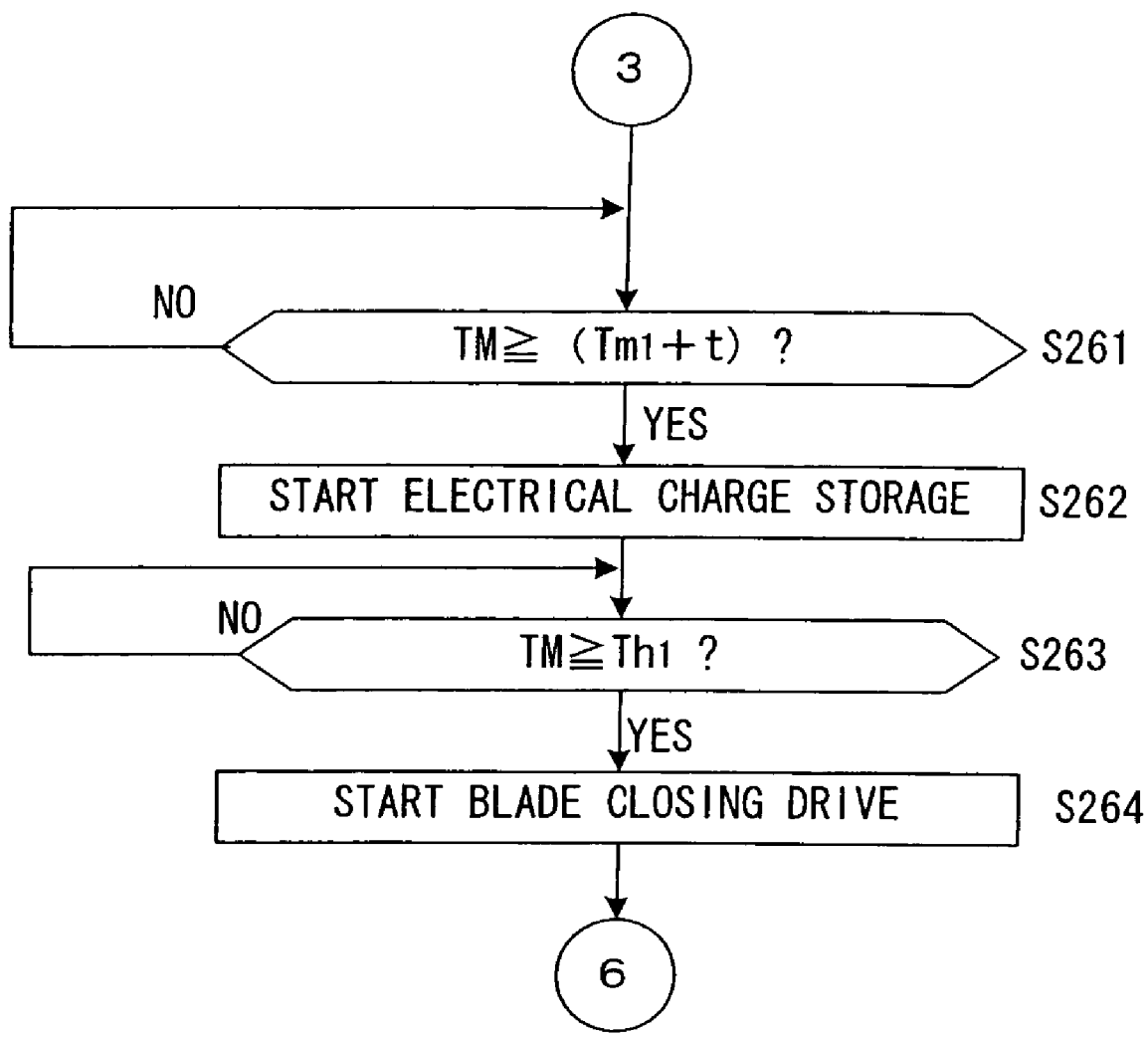
FIG. 13 presents a flowchart of the image-capturing sequence processing.

In step S261 in FIG. 13 to which the operation proceeds after making a negative decision in step S228, the arithmetic operation circuit 101 makes a decision as to whether or not TM≧(Tm1+1) is true with regard to the time count TM started in step S225. The arithmetic operation circuit 101 makes an affirmative decision in step S261 if TM≧(Tm1+t) is true to proceed to step S262, whereas it makes a negative decision in step S261 if TM≧(Tm1+t) is not true to repeatedly execute this decision-making processing. The operation proceeds to step S262 on the assumption that the exposure is to start at this time (t10 in FIG. 6).

In step S262, the arithmetic operation circuit 101 outputs a command for the timing circuit 124 to start electrical charge storage at the image-capturing element 121 and then the operation proceeds to step S263. In step S263, the arithmetic operation circuit 101 makes a decision as to whether or not TM≧Th1 is true. The arithmetic operation circuit 101 makes an affirmative decision in step S263 if TM≧Th1 is true to proceed to step S264, whereas it makes a negative decision in step S263 if TM≧Th1 is not true to repeatedly execute this decision-making processing. The operation proceeds to step S264 on the assumption that the holding time Th1 has elapsed.

In step S264, the arithmetic operation circuit 101 outputs a command for the shutter drive circuit 108 to start a reverse rotation of the motor 12 before the operation proceeds to step S233 in FIG. 11. In response, closing drive of the blade set 3 at the shutter 1 starts to close the aperture 2a with the blade set 3. The processing explained above in reference to FIG. 13 differs from the processing executed in steps S229 through S232 in FIG. 11 in that the electrical charge storage starts at the image-capturing element 121 before the start of the closing drive of the blade set 3.

Figure 14:
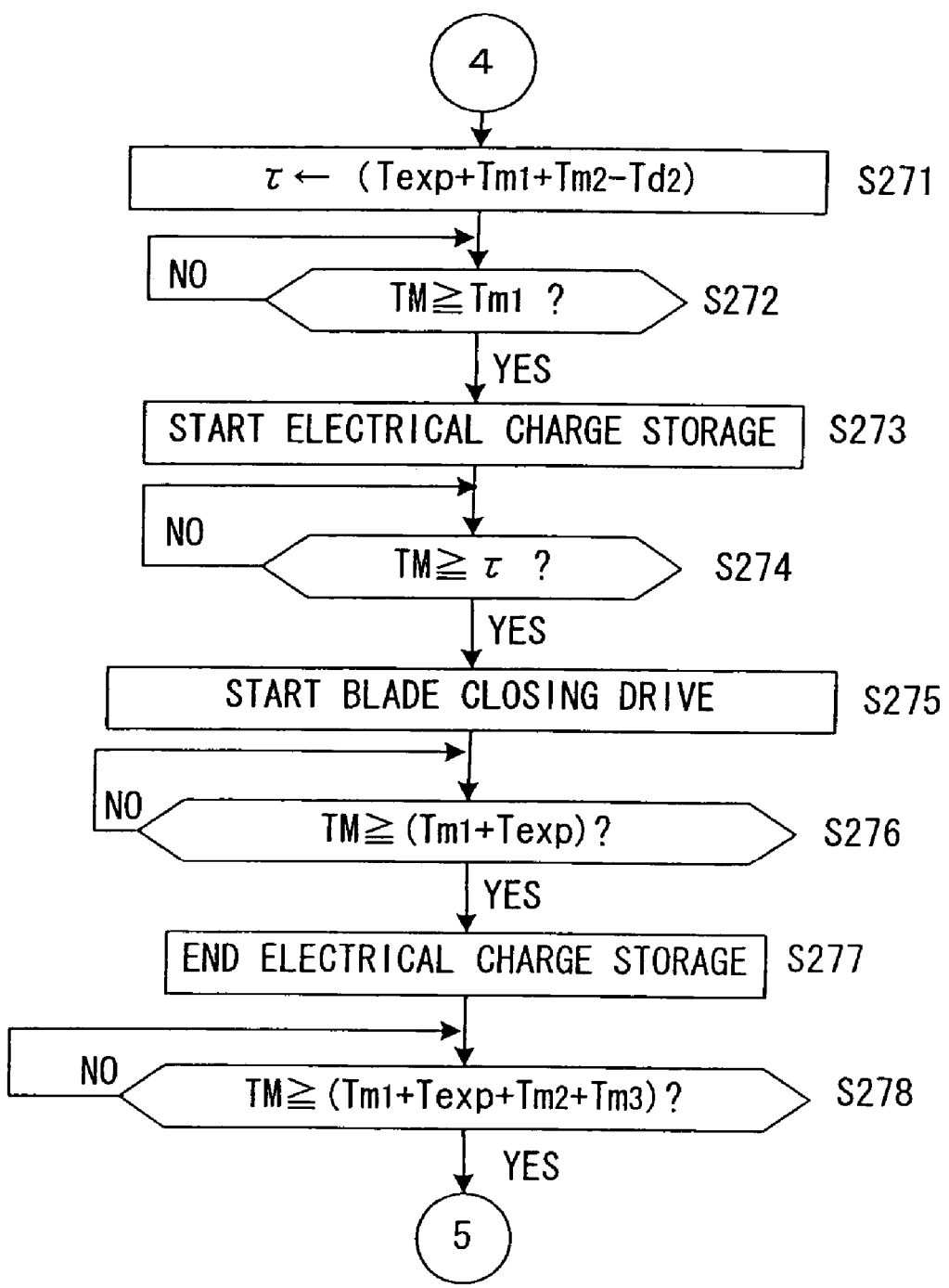
FIG. 14 presents a flowchart of the image-capturing sequence processing.

In step S271 in FIG. 14 to which the operation proceeds after making a negative decision in step S226, the arithmetic operation circuit 101 substitutes (Texp+Tm1+Tm2−Td2) for the parameter τ (length of time τ in FIG. 7) before the operation proceeds to step S272.

In step S272, the arithmetic operation circuit 101 makes a decision as to whether or not TM≧Tm1 is true with regard to the time count TM started in step S225. The arithmetic operation circuit 101 makes an affirmative decision in step S272 if TM≧Tm1 is true to proceed to step S273, whereas it makes a negative decision in step S272 if TM≧Tm1 is not true to repeatedly execute this decision-making processing. The operation proceeds to step S273 on the assumption that the pre-exposure time margin Tm1 has elapsed (time point Th in FIG. 7).

In step S273, the arithmetic operation circuit 101 outputs a command for the timing circuit 124 to start electrical charge storage at the image-capturing element 121 and then the operation proceeds to step S274. In step S274, the arithmetic operation circuit 101 makes a decision as to whether or not TM≧τ is true. The arithmetic operation circuit 101 makes an affirmative decision in step S274 if TM≧τ is true to proceed to step S275, whereas it makes a negative decision in step S274 if TM≧τ is not true to repeatedly execute this decision-making processing. The operation proceeds to step S275 on the assumption that the closing drive is to start at this time (time point t9A in FIG. 7).

In step S275, the arithmetic operation circuit 101 outputs a command for the shutter drive circuit 108 to start a reverse rotation of the motor 12 before the operation proceeds to step S276. In response, closing drive of the blade set 3 at the shutter 1 starts to close the aperture 2a with the blade set 3.

In step S276, the arithmetic operation circuit 101 makes a decision as to whether or not TM≧(Tm1+Texp) is true with regard to the time count TM started in step S225. The arithmetic operation circuit 101 makes an affirmative decision in step S276 if TM≧(Tm1+Texp) is true to proceed to step S277, whereas it makes a negative decision in step S276 if TM≧(Tm1+Texp) is not true to repeatedly execute this decision-making processing. The operation proceeds to step S277 on the assumption that the exposure is to be ended at this time (time point t11 in FIG. 7).

In step S277, the arithmetic operation circuit 101 outputs a command for the timing circuit 124 to end the electrical charge storage at the image-capturing element 121, before the operation proceeds to step S278. In step S278, the arithmetic operation circuit 101 makes a decision as to whether or not TM≧(Tm1+Texp+Tm2+Tm3) is true with regard to the time count TM started in step S225. The arithmetic operation circuit 101 makes an affirmative decision in step S278 if TM≧(Tm1+Texp+Tm2+Tm3) is true to proceed to step S241 in FIG. 12, whereas it makes a negative decision in step S278 if TM≧(Tm1+Texp+Tm2+Tm3) is not true to repeatedly execute this decision-making processing. The operation proceeds to step S241 on the assumption that a mirror-down operation should start at this time and also the aperture open reset operation should start at this time (time point t14 in FIG. 7).

The processing explained above in reference to FIG. 14 differs from the processing executed in step S227 and steps S229 through S235 in FIG. 11 in that an electrical charge storage at the image-capturing element 121 starts immediately after the pre-exposure time margin Tm1 elapses and in that the start of the reverse rotation of the motor 12 is delayed until the length of time τ calculated in correspondence to the exposure time Texp elapses.

The image capturing sequence of the electronic camera achieved in the embodiment explained above is now summarized.

A When Exposure Time Texp<(Td2−Tm2) or when (Td2−Tm2)≦Texp<(Th1+Td2−Tm1−Tm2);

(1) After the blade set 3 at the shutter 1 becomes fully open (at time point t7), the holding time Th1 elapses and then the closing drive of the blade set 3 starts (at time point t9). As a result, compared to processing during which the closing drive of the blade set 3 starts after the exposure (electrical charge storage) ends, the length of time required to execute the image capturing sequence can be reduced. This feature is particularly effective when an electromagnetic actuator with which a time lag (Td2=9 msec in the example described above) occurs at a startup or when switching the drive direction is utilized to drive the blade set 3 to close the aperture.

(2) The timing t10 with which the exposure starts is adjusted so that the exposure is completed earlier at time point t11 preceding time point t13, at which the blade set 3 at the shutter 1 moves slightly in the closing direction and actually starts to close the aperture 2a, by the post-exposure time margin TM (1 msec). As a result, the length of time elapsing between the exposure end (time point t11) and the start of the read (time point t18) of the stored electrical charges (data) at the image-capturing element 121 is reduced so as to minimize the adverse effect of noise attributable to the dark current at the photodiodes constituting the pixels at the image-capturing element 121. In addition, since the blade set 3 is driven to close the aperture 2a (i.e., to shield the image-capturing element 121 from light) immediately after the electrical charge storage (image-capturing operation), the extent of smearing manifesting during the electrical charge read can be minimized.

(3) The direction of rotation of the motor 12, which is an electromagnetic actuator, is switched and the rotation of the motor 12 is stopped respectively after the holding time Th1 and the holding time Th2. And thus, the length of time Td2 that ensues following the time point at which the drive of the motor 12 starts (t9) and lasts until the blade set 3 actually starts to close the aperture 2a (time point t13) when switching the rotating direction, and the length of time Td1 that ensues following the time point at which the drive of the motor 12 starts (t2) for the subsequent startup and lasts until the blade set 3 actually starts to open the aperture 2a (time point t4), can both be stabilized at approximately 9 msec. Consequently, the accuracy of the image capturing sequence is improved and the individual time margins Tm1 through Tm4 can be kept to minimum lengths so as to further reduce the length of time required for the image capturing sequence.

B. When Exposure Time Texp≧(Th1+Td2−Tm1−Tm2)

(1) After the blade set 3 at the shutter 1 enters a full open state (at time point t7), the length of time τ calculated in correspondence to the exposure time Texp elapses and then the closing drive of the blade set 3 starts (at time point t9A), and an electrical charge storage at the image-capturing element 121 starts (at time point t8) immediately after the pre-exposure time margin Tm1 elapses. Thus, the length of time required to execute the image capturing sequence increases only to a minimal extent over the length of time required for the image capturing sequence in A(1) described above.

(2) Since the length of time τ is calculated so as to end the exposure earlier at time point t11 preceding the time point (t13), at which the blade set 3 at the shutter 1 moves slightly in the closing direction and starts to actually close the aperture 2a, by the post-exposure time margin Tm2 (e.g., 1 msec), the extent of noise and smearing can be minimized, as in A(2).

(3) Since it is ensured that the length of time τ is at least greater than the length of the holding time Th1 in A(3), the length of time Td2 elapsing following the time point at which the drive of the motor 12 starts (t9A) and lasting until the blade set 3 actually starts to close the aperture 2a (time point t13) when switching the rotating direction of the motor 12 can be stabilized at approximately 9 msec. Thus, as in A(3), the accuracy of the image capturing sequence is improved.

When starting the closing drive of the blade set 3 at time point t9A as in B above, the power supplied to the motor 12 may be reduced once the blade set 3 at the shutter 1 enters a full open state (time point t7) and then the holding time Th1 elapses. The image capturing sequence drive mechanism that may be adopted in such an application and the corresponding operational timing of the image-capturing element 121 are now explained in reference to FIG. 15.

Figure 15:
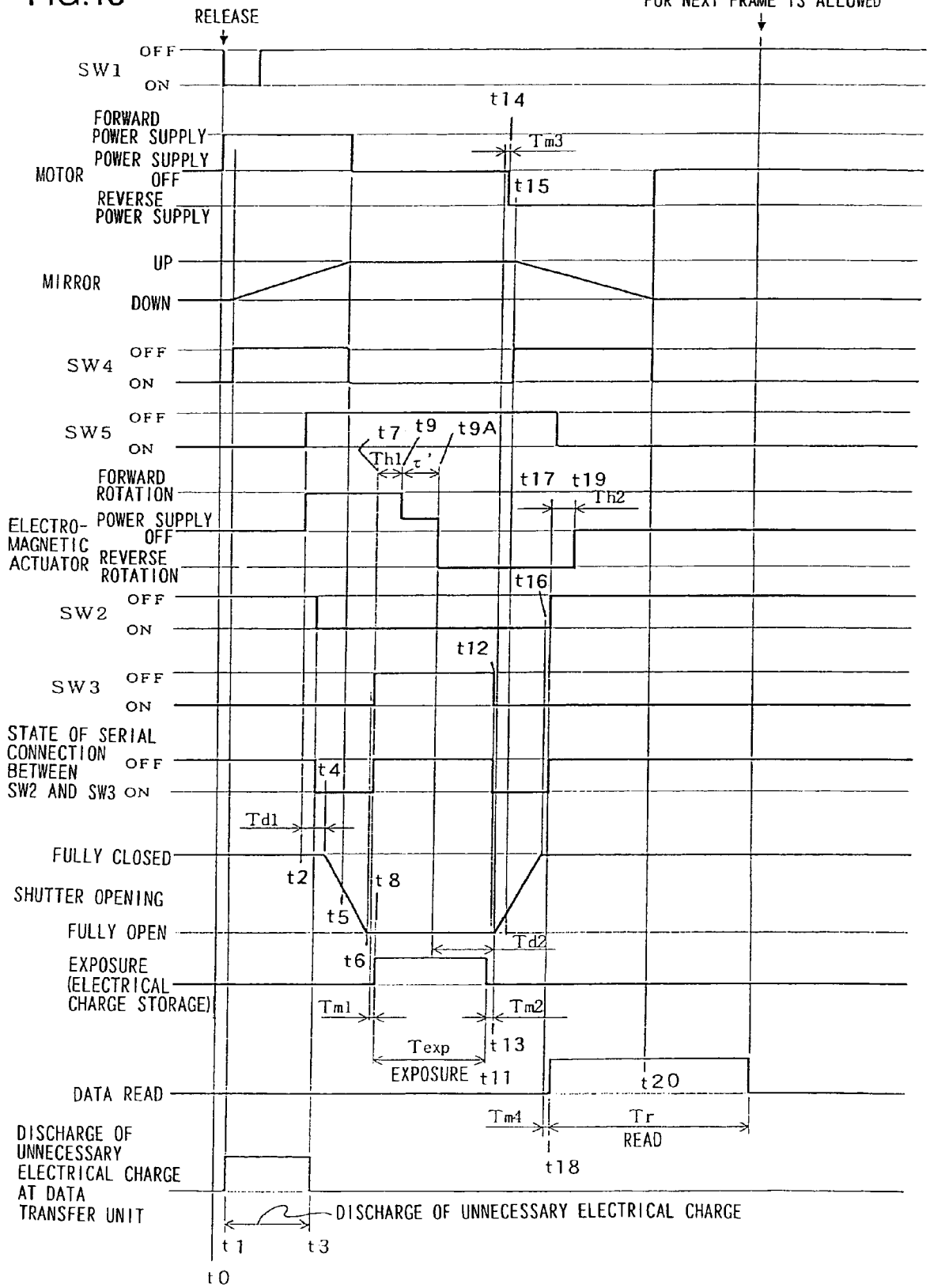
FIG. 15 shows the operational timing of the image-capturing sequence drive mechanism and the image-capturing element.

In FIG. 15, once the holding time Th1 elapses after the blade set 3 at the shutter 1 enters a full open state (at time point t7), the power supplied to the motor 12 is reduced to approximately ⅓ of the initial level (t9). The power may be reduced either by lowering the level of the supplied current or by reducing the level of the applied voltage. After the power is reduced, the length of time τ' calculated in correspondence to the exposure time Texp is allowed to elapse and then, the closing drive of the blade set 3 starts (t9A).

Figure 16:
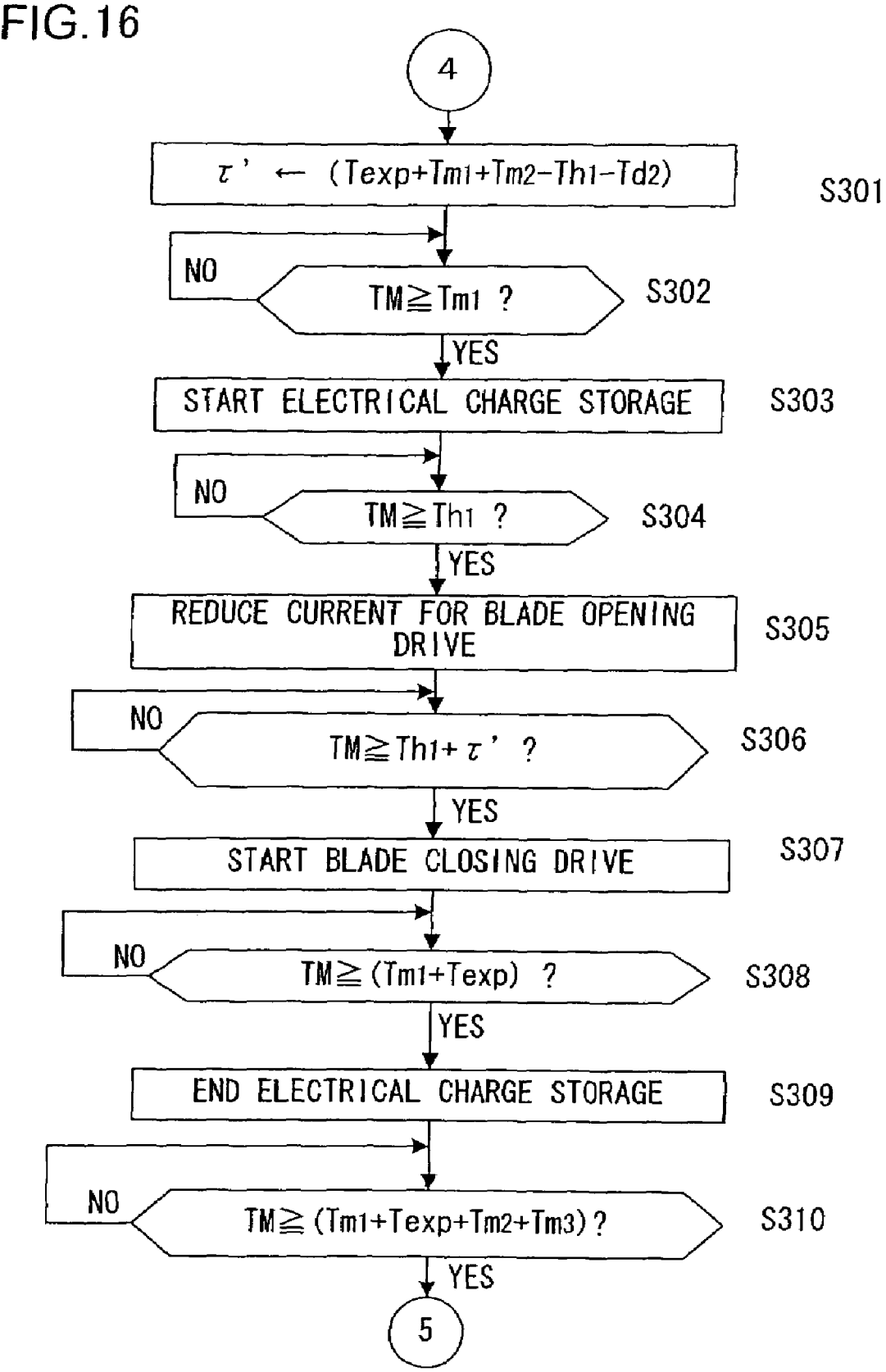
FIG. 16 presents a flowchart of the image-capturing sequence processing.

FIG. 16 presents a flowchart of the processing executed to control the image capturing sequence with the timing illustrated in the timing chart in FIG. 15. The processing in FIG. 16 is executed in place of the processing in FIG. 14. In step S301 in FIG. 16, the arithmetic operation circuit 101 substitutes (Texp+Tm1+Tm2−Th1−Td2) for the parameter τ' (the length of time τ' in FIG. 15) and then the operation proceeds to step S302.

Since the processing executed in steps S302 and S303 is similar to that executed in steps S272 and S273 in FIG. 14 respectively, an explanation of the processing is omitted.

In step S304, the arithmetic operation circuit 101 makes a decision as to whether or not TM≧Th1 is true with regard to the time count TM started in step S225 (FIG. 11). The arithmetic operation circuit 101 makes an affirmative decision in step S304 if TM≧Th1 is true to proceed to step S305, whereas it makes a negative decision in step S304 if TM≧Th1 is not true to repeatedly execute this decision-making processing. The operation proceeds to step S305 on the assumption that the holding time Th1 has elapsed.

In step S305, the arithmetic operation circuit 101 outputs a command for the shutter drive circuit 108 to reduce the power supplied to the motor 12 and then the operation proceeds to step S306. In step S306, the arithmetic operation circuit 101 makes a decision as to whether or not TM≧(Th1+τ') is true with regard to the time count TM started in step S225. The arithmetic operation circuit 101 makes an affirmative decision in step S306 if TM≧(Th1+τ') is true to proceed to step S307, whereas it makes a negative decision in step S306 if TM≧(Th1+τ') is not true to repeatedly execute this decision-making processing. The operation proceeds to step S307 on the assumption that the closing drive is to start at this time (time point t9A in FIG. 7).

Since the processing executed in steps S307 through S310 is similar to that executed in steps S275 through S278 in FIG. 14 respectively, an explanation of the processing is omitted.

By executing the processing as explained above in reference to FIGS. 15 and 16, advantages similar to those of the processing explained in B (1) through (3) are realized, and furthermore, since the power supplied to the motor 12 is reduced when the exposure time is significant, power is saved and the extent of increase in temperature due to the heat generated at the motor 12 can be minimized.

The numerical values of Th1, Th2, Tm1 through Tm4, Td1, Td2 and the like are not limited to those used in the examples explained above. A time margin may be set to, for instance, 0.5 msec.

It is to be noted that the components used in the embodiments described above may constitute the following elements. The shielding member is constituted with, for instance, the blade set 3 (focal plane shutter 1). The electromagnetic actuator may be constituted with, for instance, the motor 12. The means for storage control and the means for shield control may be constituted with, for instance, the arithmetic operation circuit 101.

The above described embodiments are examples, and various modifications can be made without departing from the spirit and scope of invention.

What is claimed is:

1. An electronic camera, comprising:
an electrical charge storage-type image-capturing element that stores an electrical charge by receiving subject light;
a shielding member that consists of a single set of blades that are coupled to each other and that is configured to move between an open position in which the subject light is allowed to pass to the image-capturing element and a closed position in which the subject light is blocked from the image-capturing element;

an electromagnetic actuator used to drive the shielding member to move from the open position to the closed position and to move from the closed position to the open position;
a storage control device that starts an electrical charge storage at the image-capturing element after a time point at which the shielding member is detected in the open position and ends the electrical charge storage once a preset length of exposure time elapses; and
a shield control device that outputs an instruction to the electromagnetic actuator for driving the shielding member to move to the closed position before the electrical charge storage ends, wherein
the storage control device adjusts timing with which the electrical charge storage starts so as to ensure that the electrical charge storage ends right before a time point at which drive of the shielding member is started in response to the instruction for driving the shielding member to move to the closed position, if a length of exposure time is shorter than a sum of a time period Th1 and a time period Td2,
the time period Th1 is a time period for sustaining an instruction to the electromagnetic actuator for driving the shielding member to move to the open position even after the open position has been achieved and the shielding member has stopped, for stabilization of driving the shielding member to move to the closed position, and
the time period Td2 is a time period between a time point at which the shield control device outputs the instruction to the electromagnetic actuator for driving the shielding member to move to the closed position and a time point at which the drive of the shielding member is actually started.

2. An electronic camera according to claim 1, wherein:
if a length of exposure time is so great that the electrical charge storage does not end right before the time point of the drive start even with the timing with which the electrical charge storage starts advanced by the storage control device, the shield control device delays issuing the instruction for driving the shielding member to move to the closed position in correspondence to the length of exposure time to the electromagnetic actuator.

3. An electronic camera according to claim 1, wherein:
the image-capturing element discharges an unnecessary electrical charge between a specific time point after an instruction for a photographing start is issued and a time point at which the shielding member in the closed position is no longer detected.

4. An electronic camera according to claim 1, wherein:
the image-capturing element starts outputting the stored electrical charge once the shielding member in the closed position is detected following an end of the electrical charge storage.

5. An electronic camera according to claim 1, wherein:
the storage control device sets an exposure start time at which a time period of substantially "the time period Th1+the time period Td2−the length of exposure time" elapses from a time point at which the open position has been achieved and the shielding member has stopped.

* * * * *

UNITED STATES PATENT AND TRADEMARK OFFICE
CERTIFICATE OF CORRECTION

| | | |
|---|---|---|
| PATENT NO. | : 7,692,716 B2 | Page 1 of 1 |
| APPLICATION NO. | : 10/991855 | |
| DATED | : April 6, 2010 | |
| INVENTOR(S) | : Wakabayashi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 823 days.

Signed and Sealed this
Twenty-second Day of February, 2011

David J. Kappos
*Director of the United States Patent and Trademark Office*